Figure 1:
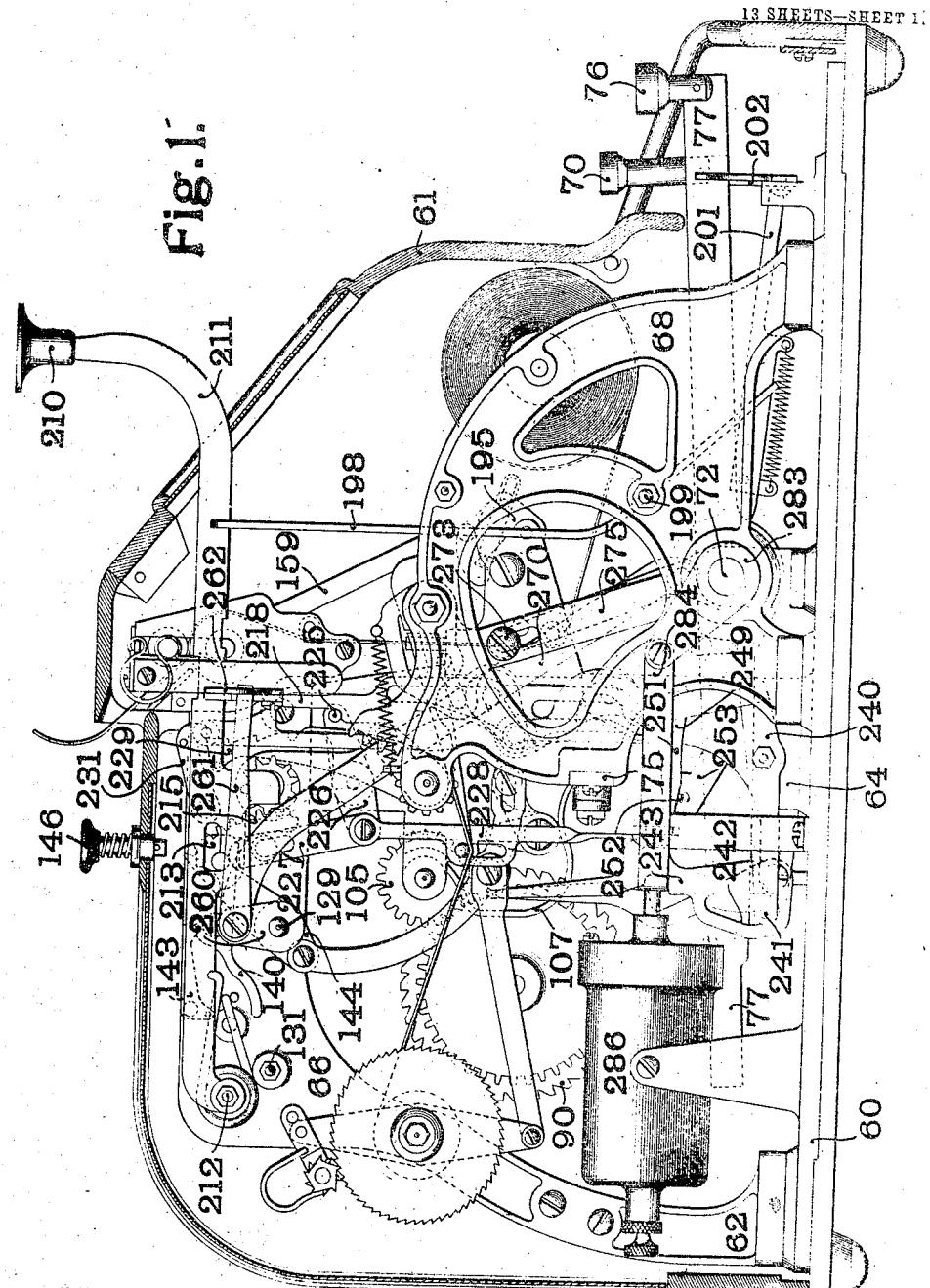

No. 833,388. PATENTED OCT. 16, 1906.
G. N. HINCHMAN.
ADDING MACHINE.
APPLICATION FILED NOV. 13, 1905.

13 SHEETS—SHEET 1.

WITNESSES:
Fred C. Henke.
W. A. Alexander

INVENTOR
G. N. Hinchman.
BY
Fowler & Bryson
ATTORNEYS

No. 833,388. PATENTED OCT. 16, 1906.
G. N. HINCHMAN.
ADDING MACHINE.
APPLICATION FILED NOV. 13, 1905.

13 SHEETS—SHEET 2.

WITNESSES:
Fred C. Henke.
W. A. Alexander

INVENTOR
G. N. Hinchman.
BY
Fowler & Bryan
ATTORNEYS

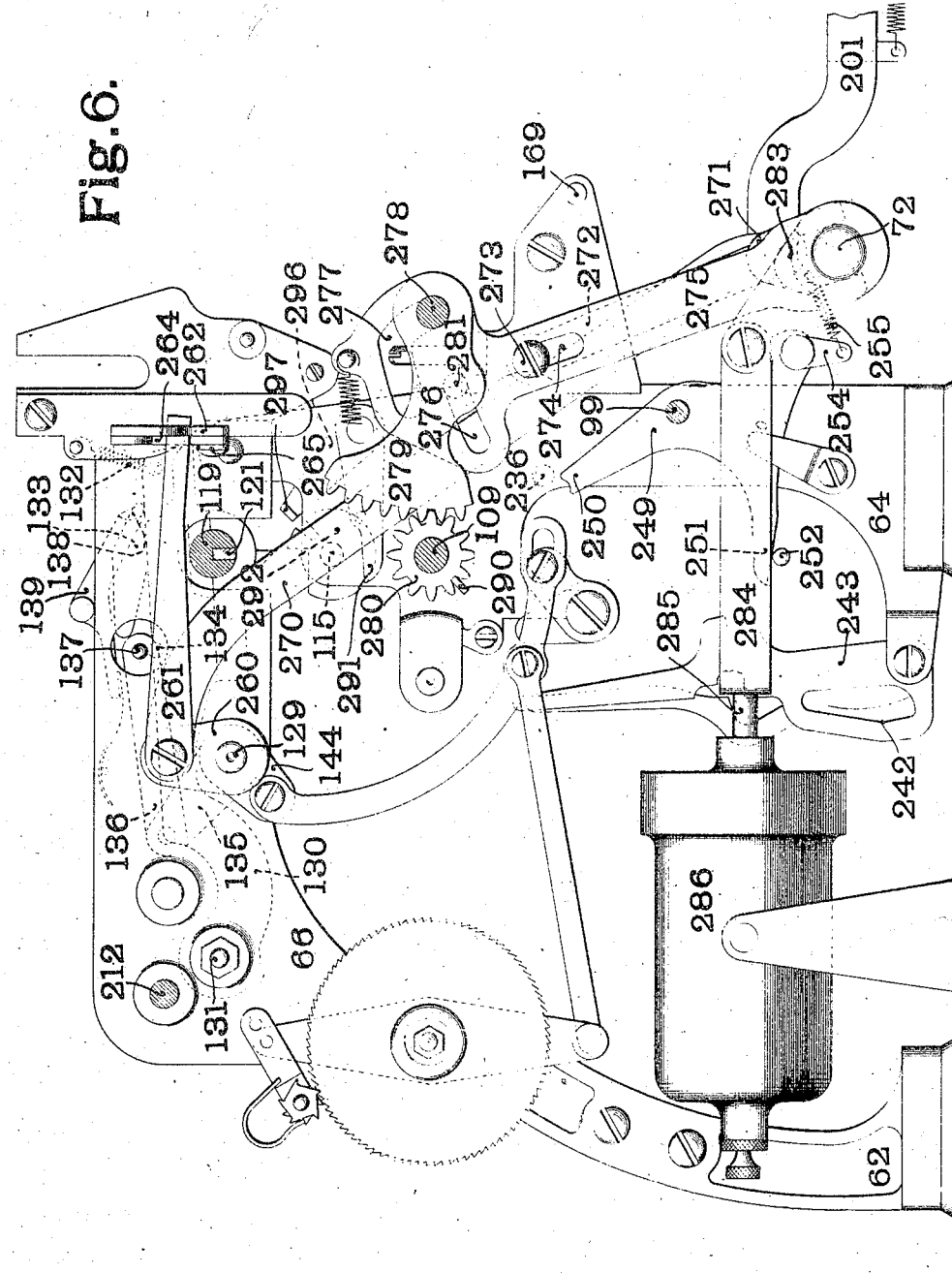

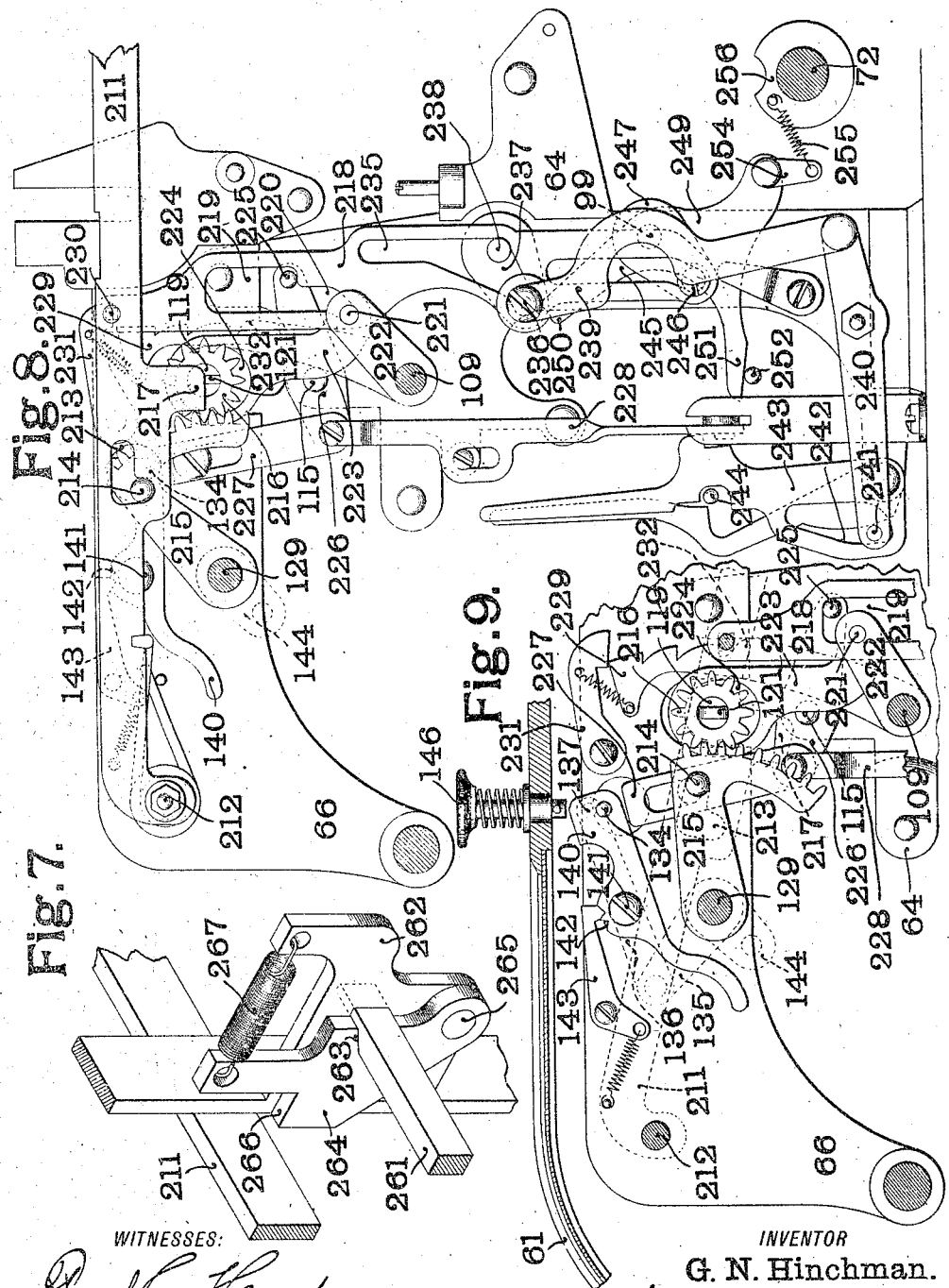

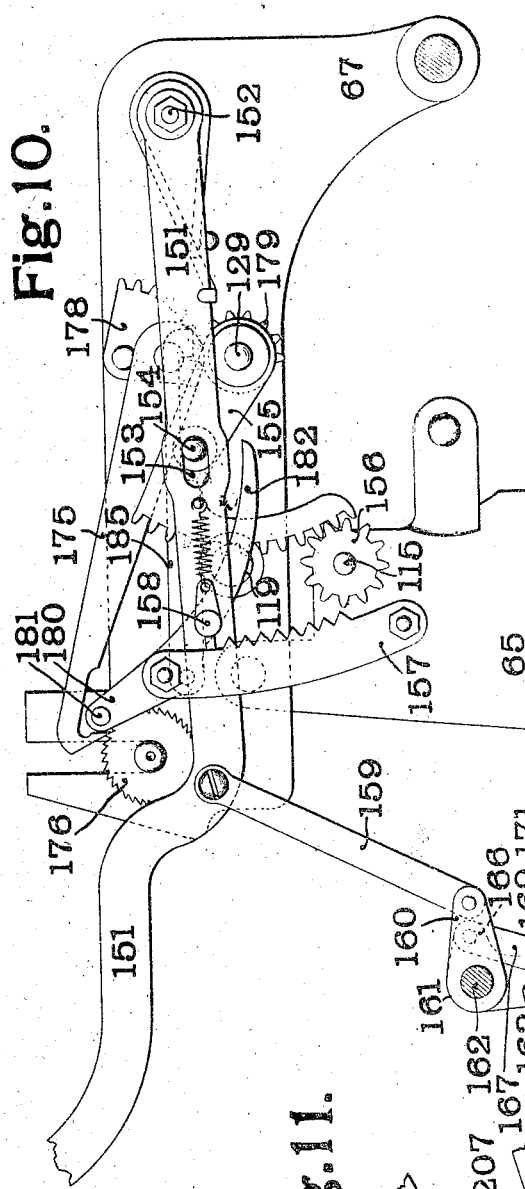

No. 833,388. PATENTED OCT. 16, 1906.
G. N. HINCHMAN.
ADDING MACHINE.
APPLICATION FILED NOV. 13, 1905.
13 SHEETS—SHEET 9.
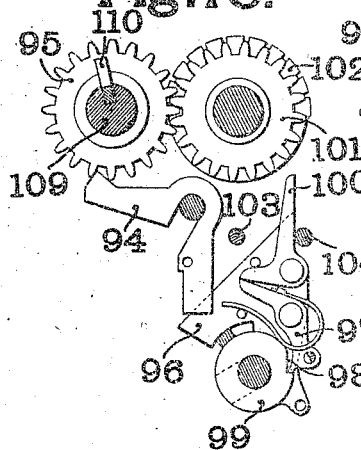
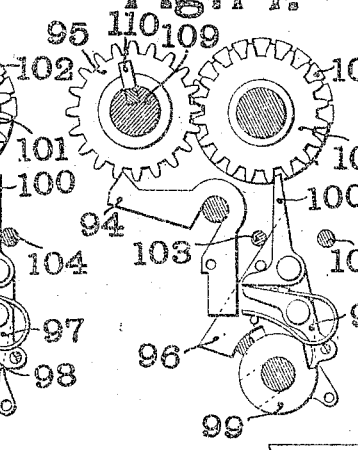
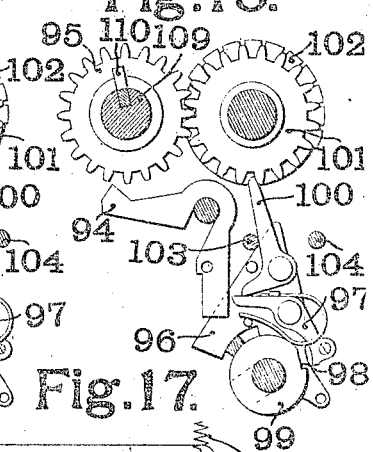
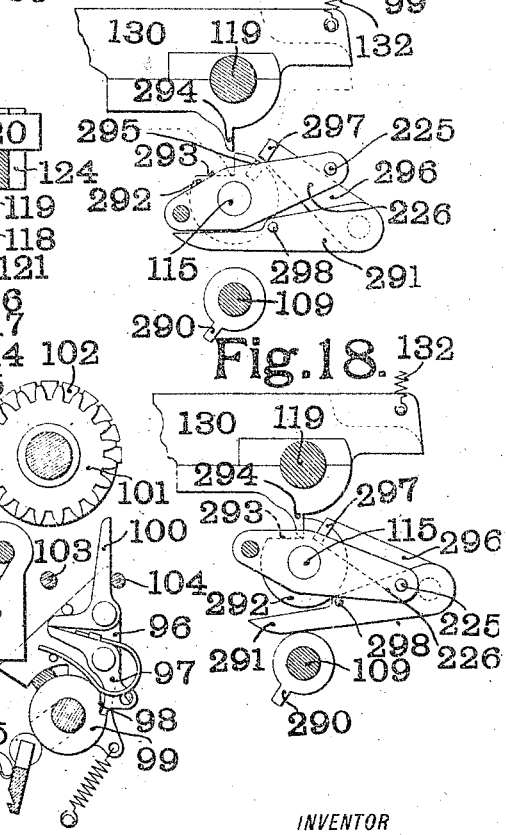
WITNESSES:
Fred C. Henke.
W. H. Alexander.
INVENTOR
G. N. Hinchman.
BY
Foster & Bryson
ATTORNEYS

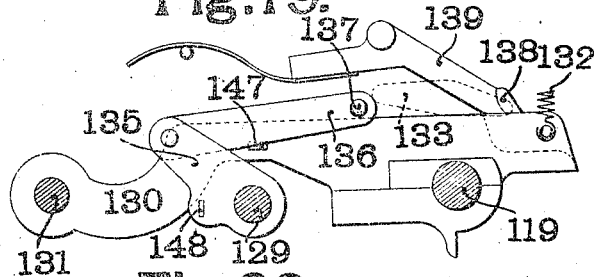
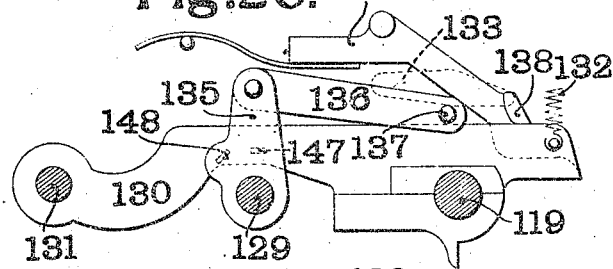
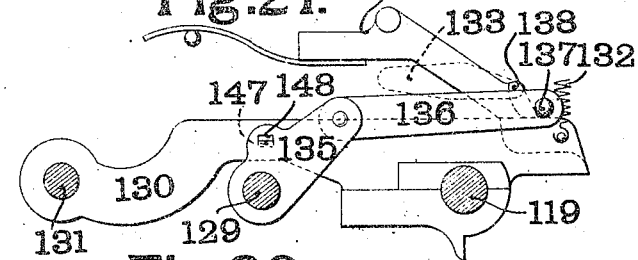
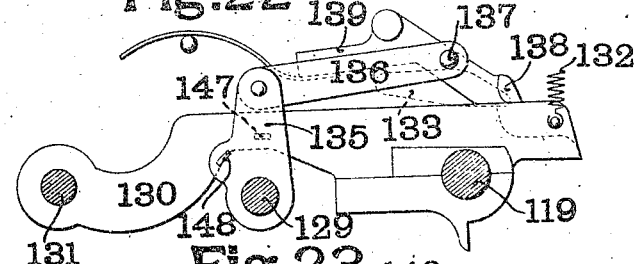
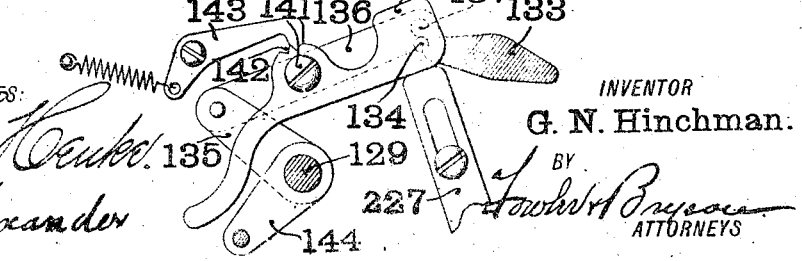

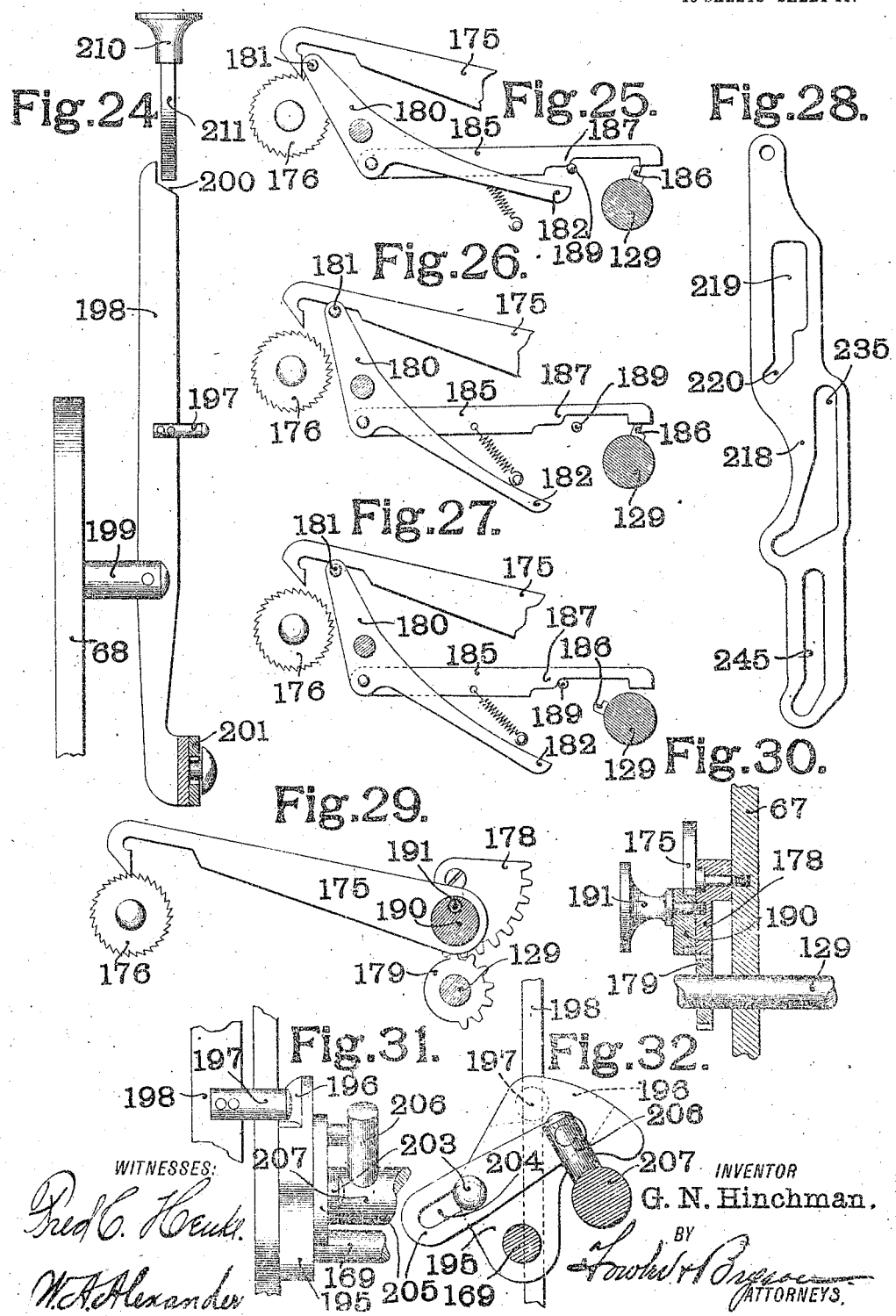

No. 833,388. PATENTED OCT. 16, 1906.
G. N. HINCHMAN.
ADDING MACHINE.
APPLICATION FILED NOV. 13, 1905.

13 SHEETS—SHEET 12.

WITNESSES:
Fred C. Hauke
W. H. Menander

INVENTOR
G. N. Hinchman.
BY
Fowler & Bryson
ATTORNEYS

No. 833,388. PATENTED OCT. 16, 1906.
G. N. HINCHMAN.
ADDING MACHINE.
APPLICATION FILED NOV. 13, 1905.

13 SHEETS—SHEET 13.

WITNESSES:
Fred Henke
W. A. Alexander

INVENTOR
G. N. Hinchman
BY
Fowler & Bryson
ATTORNEYS

UNITED STATES PATENT OFFICE.

GEORGE N. HINCHMAN, OF WEBSTER GROVES, MISSOURI, ASSIGNOR TO THE STANDARD ADDING MACHINE COMPANY, OF ST. LOUIS, MISSOURI, A CORPORATION OF MISSOURI.

ADDING-MACHINE.

No. 833,388.          Specification of Letters Patent.         Patented Oct. 16, 1906.

Application filed November 13, 1905. Serial No. 287,118.

*To all whom it may concern:*

Be it known that I, GEORGE N. HINCHMAN, a citizen of the United States, residing at Webster Groves, in the county of St. Louis and State of Missouri, have invented a certain new and useful Adding-Machine, of which the following is such a full, clear, and exact description as will enable any one skilled in the art to which it appertains to make and use the same, reference being had to the accompanying drawings, forming part of this specification.

My invention relates to an adding-machine and more particularly to that class of adding-machines known as the "Standard Adding Machine" and as shown and described in the patent to W. W. Hopkins, No. 683,939, of October 8, 1901.

One of the principal objects of my invention is so to construct the adding-machine above referred to that the direction of rotation of the type-wheels is not reversed when taking the total. This construction enables me to use but a single set of type upon each type-wheel in place of two sets, as in the Hopkins machine.

Other advantages are also obtained from this construction, as it enables many operations to be performed by the machine which could not be done or could only be done with great difficulty in a machine in which the direction of the type-wheels is reversed upon taking the total.

One of the advantages attendant upon the above construction is that the machine can be provided with an error-key mechanism, which takes a number out of the machine before it has been placed in the accumulating mechanism or adding-wheels, thus avoiding any disturbance of the adding-wheels when an incorrect number is placed in the adding-machine. It also places the entire work of transferring the number to the accumulating mechanism, as well as the carrying, on the handle, thus relieving the order-keys of considerable work, and consequently lightening their touch correspondingly.

Another advantage obtained from this construction is that the machine can be provided with a subtotal mechanism which will carry forward the sum taken by means of the total-lever.

Another object of my invention is to lock the carrying-bars in their forward position until the time when the adding-wheels are operated, thus insuring the accuracy of the carrying mechanism.

Other objects of my invention are to provide the machine with various locks which will enhance the accuracy of the machine and prevent improper manipulation of the various keys.

Figure 2:
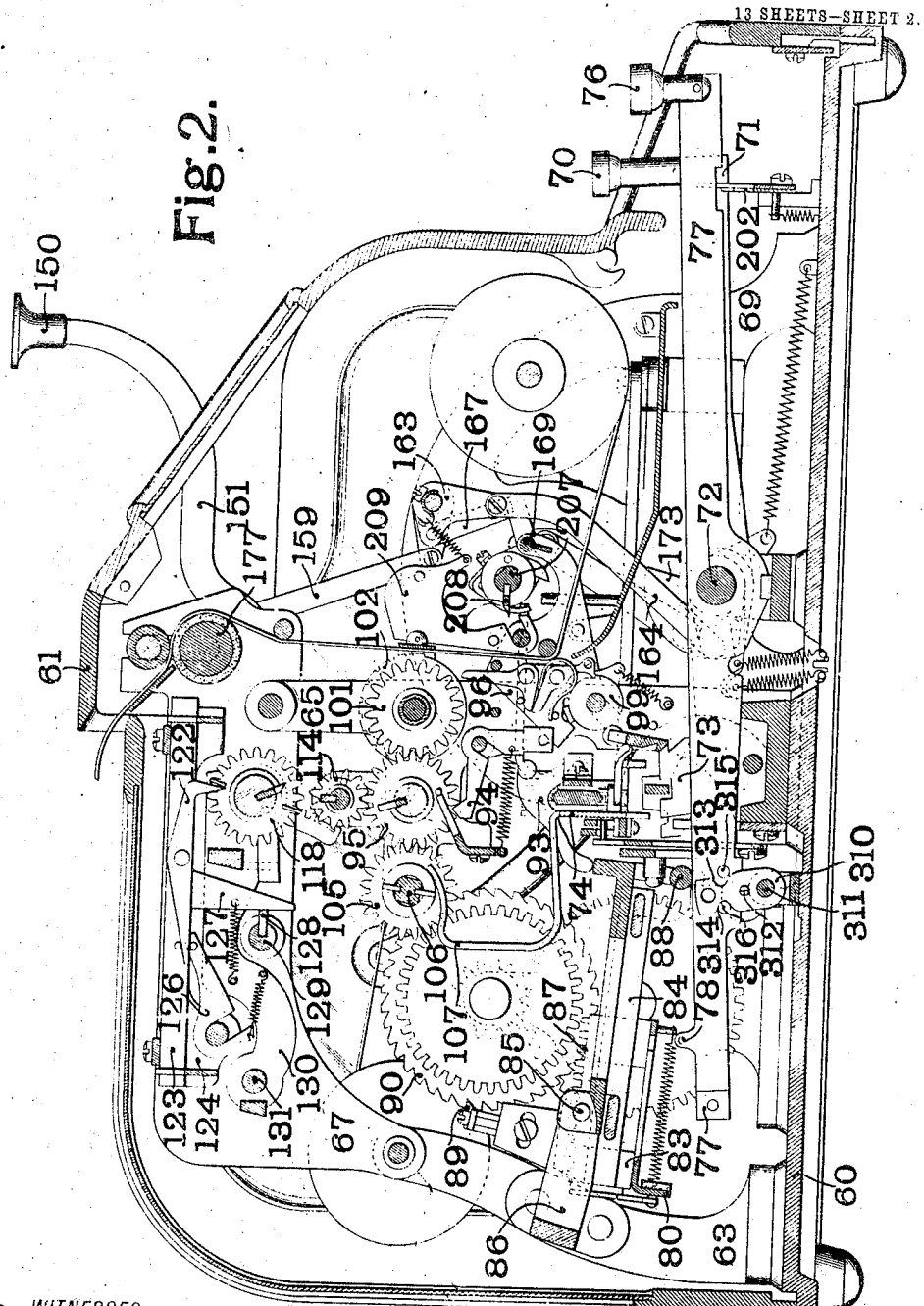
Figure 3:
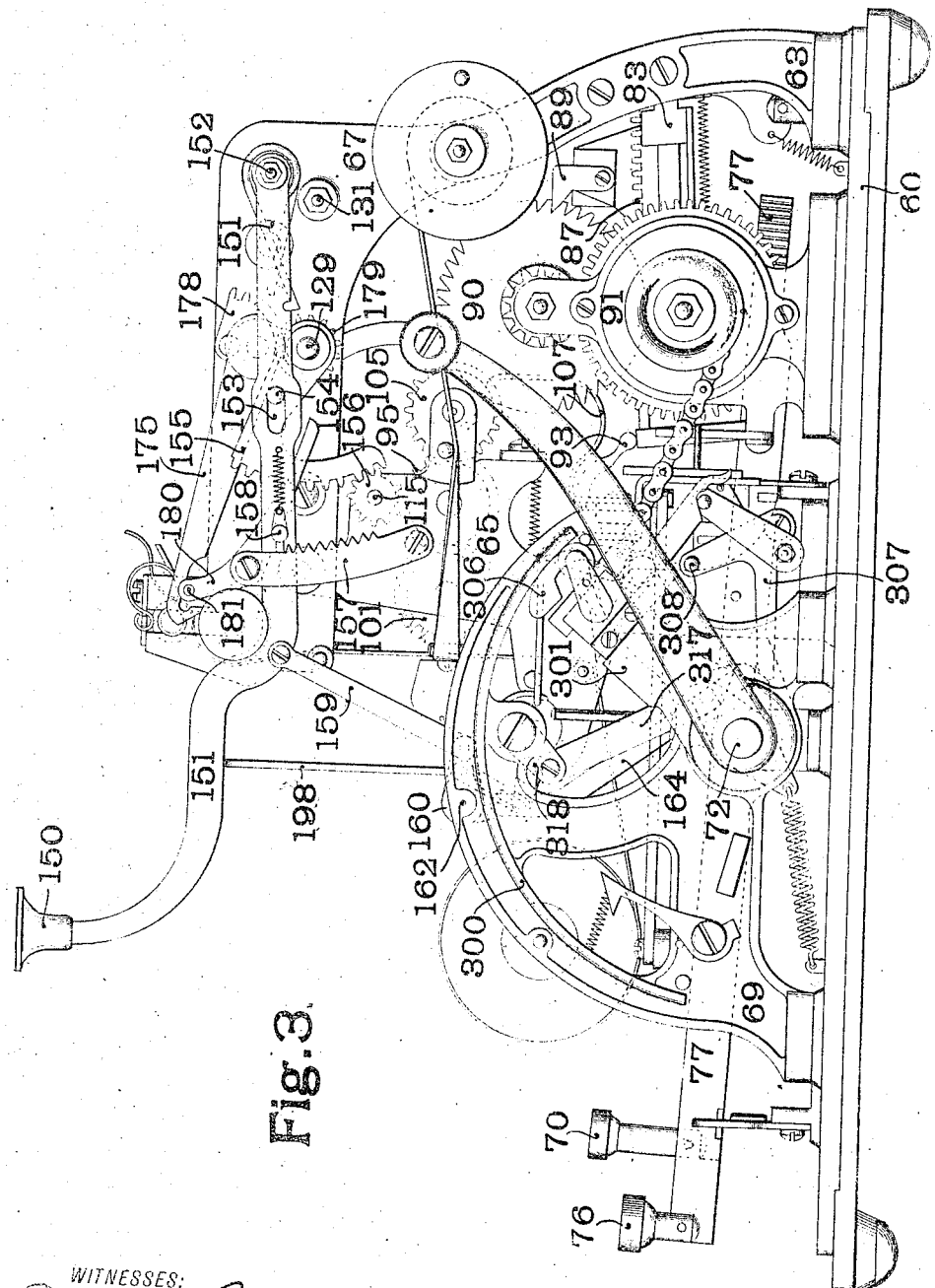
Figure 4:
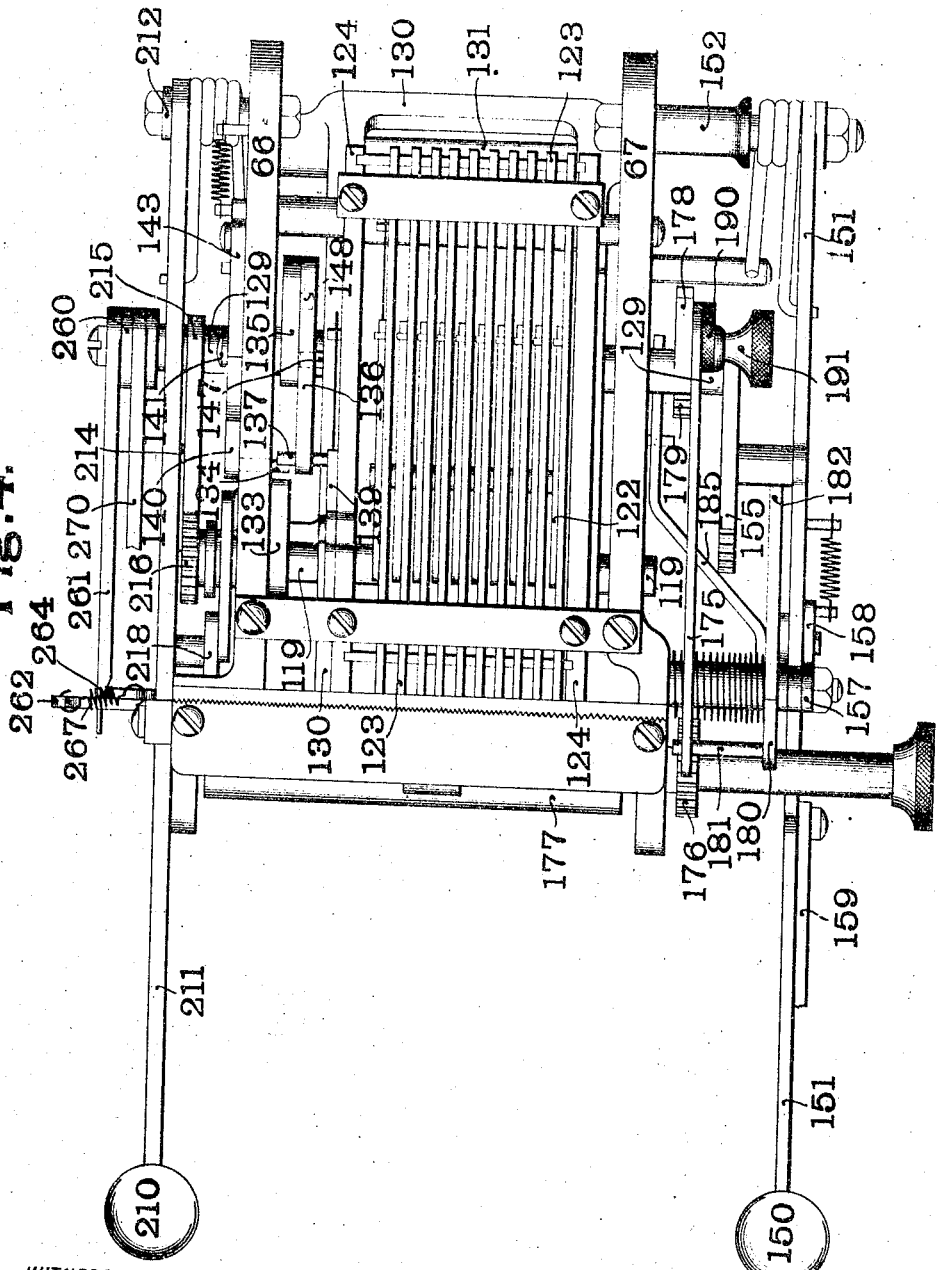
Figure 5:
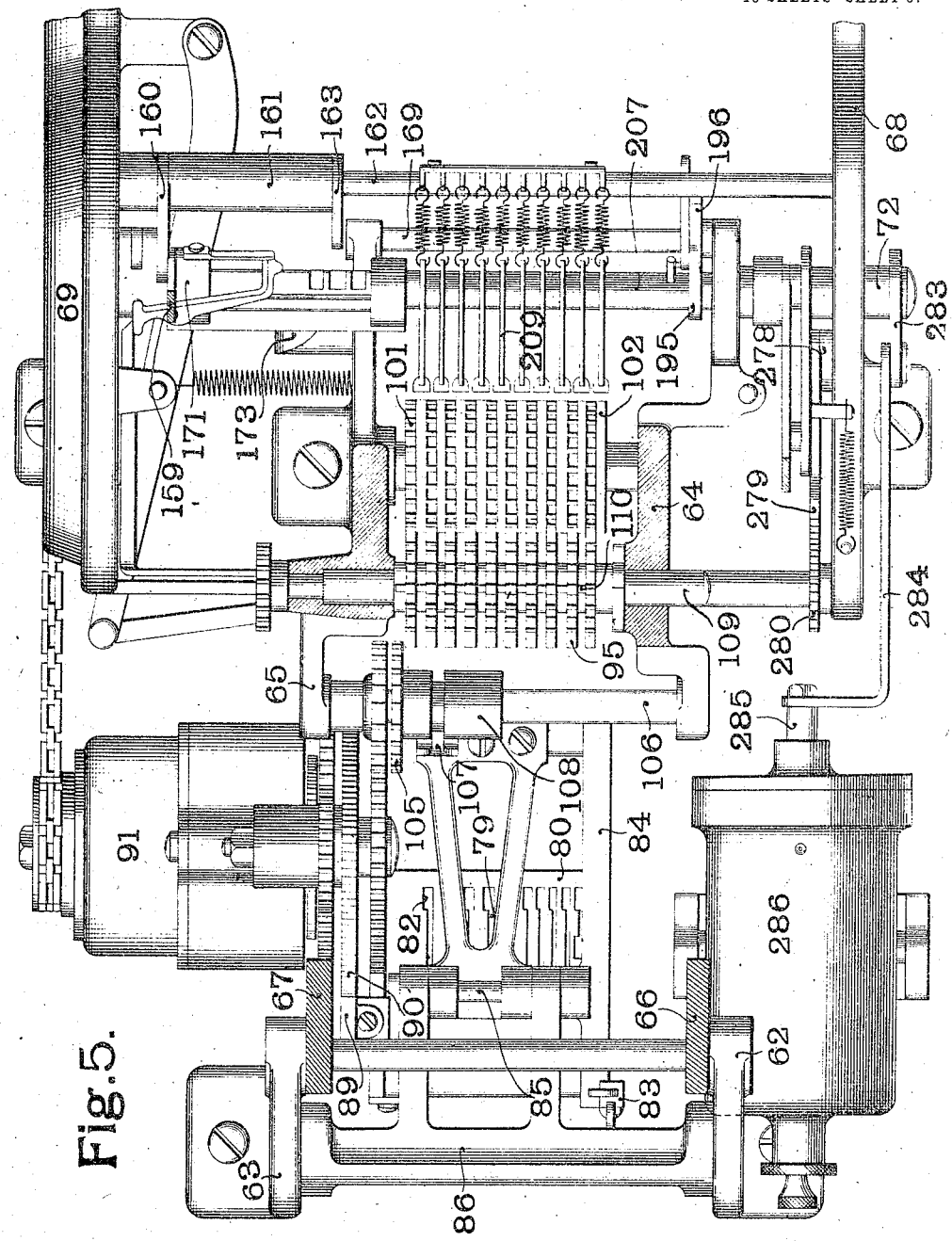
Figure 33:
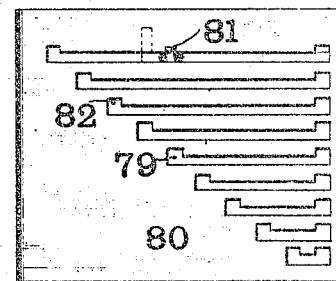
Figure 34:
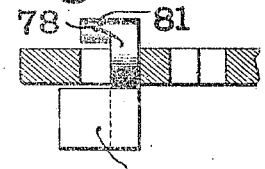
Figure 35:
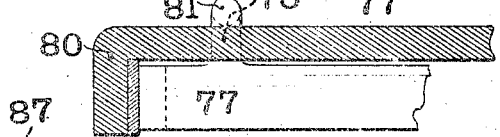
Figure 36:
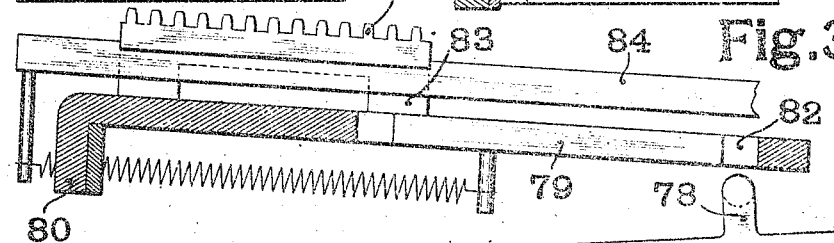
Figure 37:
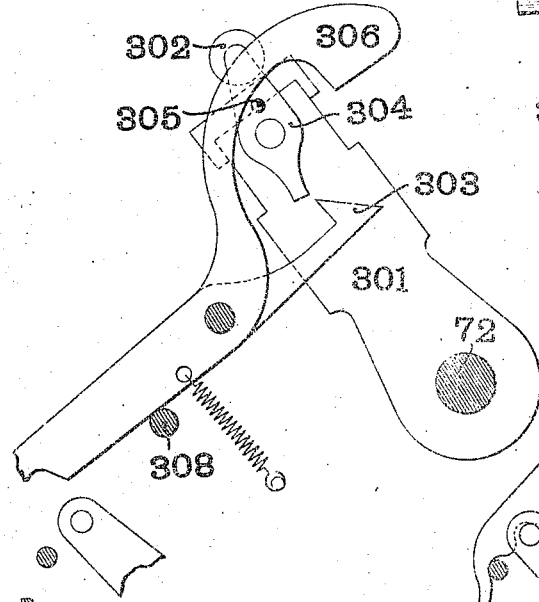
Figure 38:
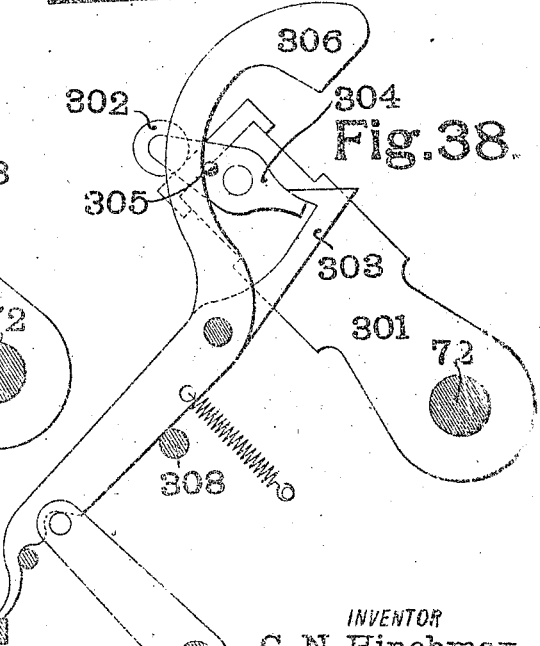
Figure 39:
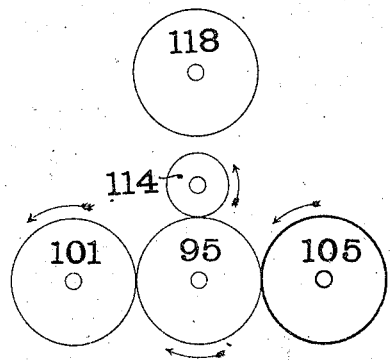
Figure 40:
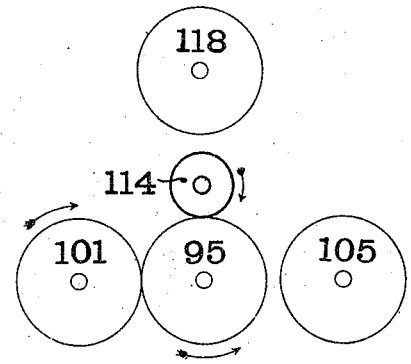
Figure 41:
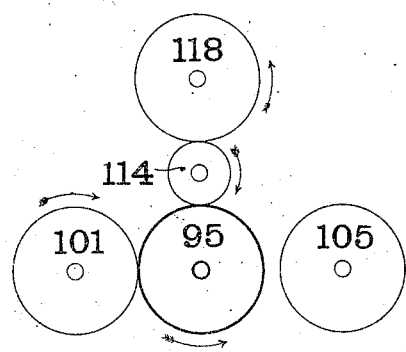
Figure 42:
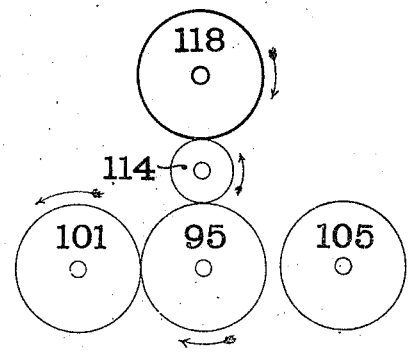

In the accompanying drawings, which illustrate an adding-machine made in accordance with my invention, Figure 1 is a side elevation of the complete machine, the case being shown in section. Fig. 2 is a vertical longitudinal section of the complete machine. Fig. 3 is a side elevation looking from the opposite side to that shown in Fig. 1, the case being omitted. Fig. 4 is a top plan view of a portion of the machine. Fig. 5 is a horizontal section. Fig. 6 is a side view of the rear part of the machine, showing the various parts upon the left-hand side of the machine which are operated on the pull of the handle. Fig. 7 is an enlarged isometric projection, showing a lock for the total-key. Fig. 8 is a side elevation of a portion of the machine, showing the parts operated by the total-key. Fig. 9 is a view showing some of the parts illustrated in Fig. 8, the total-key being depressed. Fig. 10 is a side elevation showing the error-key and paper-feeding mechanism. Fig. 11 is a detail view of some of the parts shown in Fig. 10. Fig. 12 is a view showing some of the parts in Fig. 10, the error-key being depressed. Figs. 13, 14, and 15 are detail views of the mechanism for stopping the carriage when taking the total, the parts being shown in different positions in the various views. Fig. 16 is a detail view of the carrying mechanism and adjacent parts. Fig. 17 is a detail view showing a locking mechanism for the error-key, total-key, and handle. Fig. 18 is a view similar to Fig. 17, but showing the parts in a different position. Figs. 19 to 22 are detail views showing the mechanism for controlling the adding-wheel frame, the parts being shown in different positions. Fig. 23 is a detail view showing the controlling mechanism for the subtotal device. Fig. 24 is a detail view showing a portion of the locking device for the numeral-keys and total-keys. Figs. 25 to 27 are detail views showing the mechanism for controlling the paper-feed. Fig. 28 is a detail view of a cam-plate operated by the total-lever. Figs. 29 and 30 are detail views showing the operating means for the paper-feed. Figs. 31 and 32 are enlarged detail views showing the mechanism for locking the order and numeral keys. Figs. 33, 34, 35, and 36 are enlarged detail views showing the mechanism for controlling the sliding rack. Figs. 37 and 38 are enlarged detail views of the locking mechanism for the handle; and Figs. 39 to 43 are diagrammatic views illustrating the various movements of the total, printing, idle, and intermediate gears.

Like marks of reference refer to similar parts in the several views of the drawings.

60 is the base which supports the frame of the machine and the case or housing 61. At the rear of the base are secured two uprights 62 and 63 and at the central portion of the base two intermediate uprights 64 and 65. The uprights 62 and 63 and 64 and 65 carry side frames 66 and 67, which support the adding and carrying mechanism, together with the paper-feeding mechanism and some of the parts which are operated by the error-key and total-key. In addition to these supports are two side frames 68 and 69, which support the handle-shaft and various other portions of the mechanism.

70 represents the order-keys carried by the key-bars 71. These bars 71 are pivoted on the handle-shaft 72, Fig. 2, journaled in the side frames 68 and 69. The rear end of each of the key-bars 71 is provided with an upward projection 73, which is adapted to release the carriage 74 and stop the same in the proper order to begin the registration of the number. The carriage 74 moves upon a guide-bar 75, Fig. 16, supported in the side frames 68 and 69.

76 represents numeral-keys carried by key-bars 77, which are also pivoted on the handle-shaft 72. These key-bars 77 are of various lengths, as shown in Fig. 3, and each is provided near its end with an upward projection 78. (See also Figs. 33 to 36.) These projections 78 are adapted to enter slots 79 in a guide-plate 80, as shown in detail in Fig. 32. Each of the upward projections 78 is provided with a lateral extension 81, and the slots 79 are provided at each end with enlargements 82 to allow the passage of said lateral projection 81, so that when the projection 78 passes through one of said enlargements of the slot 79 it cannot return to its normal position until the plate 80 has completed its travel. The plate 80 is carried by a frame 83, slidingly mounted upon a frame 84, which is pivoted at 85, Fig. 2, to arms 86, carried by uprights 62 and 63. This frame 83 is also provided with a rack 87, which is adapted to control the movement communicated from the motor to the adding and printing mechanism, as will be hereinafter more fully described. The forward end of the frame 84 is provided with a cross-bar 88, which rests upon the key-bars 77, so that the said frame 84 is swung upon its pivot 85 each time one of the numeral-keys is depressed. The rear end of the pivoted frame 84 is provided with a detent 89, which engages with the escapement-wheel 90, controlling the motor 91. The forward end of the frame 84 is also provided with an upward projection 92, Fig. 16, upon which rests one end of a pawl 93, adapted to release the centering-pawls 94 from the intermediate gears 95.

Immediately in front of the carriage 74 are the order stop-pawls 96, which stop the carriage in the proper order when a total is being taken. These order stop-pawls 96 are provided with a compound releasing mechanism, consisting of a pawl or dog 97, engaging with a notch 98 in a grooved shaft 99, carrying the said order stop-pawls, and a second pawl or dog 100, also pivoted to said order stop-pawls, engaging with the first-named dog 97. By means of this construction the upper end of the dog 100 can be thrown into engagement with the gears 101, carrying the type-wheels 102, so as to move in the same direction in which the motion is imparted to said gears 101, thus insuring the tripping of the pawls 96 immediately after the gear 101 has begun its rotation. The movement of the pawls 96 toward the rear is limited by a cross-rod 103, which also acts as a fulcrum for tripping-pawls 100. A rod 104 limits the movement of the order stop-pawls 96 in the opposite direction. The intermediate gears 95 are successively engaged by a longitudinally-sliding gear 105, mounted upon a shaft 106. The gear 105 is so mounted upon the shaft 106 as to slide longitudinally thereof but to be incapable of independent rotation. The longitudinal movement of the gear 105 is controlled by a bent arm 107, carried by the carriage 74 and engaging with a groove in a sleeve 108, attached to said wheel 105. The intermediate gear 95 is loosely mounted upon a shaft 109, carrying a comb 110, and each of said intermediate gears is provided with a pin 111, adapted to engage with the said comb 110 and with a stop 112. Arranged above the intermediate gears 95 are a set of idle gears 114, mounted upon a shaft 115, provided with a comb 116. Each of said gears is also provided with a pin 117, adapted to be engaged by the comb 116. Arranged above the idle wheels 114 and normally out of engagement therewith are the adding-wheels 118, which are loosely mounted upon a shaft 119 and provided at diametrically opposite points with a pair of lateral teeth or lugs 120. Mounted in the shaft 119 is a comb 121, which is normally out of the path of the lugs 120, but which can be moved into the path of said lugs by being shifted longitudinally, as in the Hopkins patent above referred to.

The lugs 120 are also adapted to engage with tripping-pawls 122 on the carrying-bars 123. The bars 123 are slidingly mounted in a frame 124, secured between the side frames 66 and 67. Each of the tripping-pawls 122 rests upon a pin 125 in a retaining-pawl 126, which holds the carrying-bar to the left in its normal position. Each of the bars 123 is provided with a downward projection 127, which normally rests against a plate 128, carried in a rock-shaft 129. The object of this plate 128 is to return the carrying-bars to their normal position after any bar has been tripped in the operation of adding. In the Hopkins patent above referred to the plate 128 is normally out of engagement with the downward projection 127, so that the carrying-bars 123 might possibly be tripped while the parts are in normal position. In my construction, however, the bars 123 are securely locked in their normal position until the proper time in the operation of the machine when the bars should be tripped to carry. The shaft 119 is carried in a frame 130, mounted on a rock-shaft 131, said shaft being journaled into side frames 66 and 67.

Figure 43:
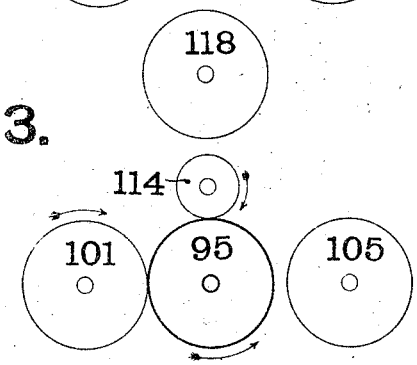

The operation of the parts above described is, briefly, as follows: In writing in a number one of the order-keys 70 is first depressed to release the carriage 74 and position the same in the corresponding order, so that the wheel 105 will mesh with the intermediate wheel 95 of the order corresponding to the left-hand digit of the number to be written. The numeral-keys 76 are then depressed so as to actuate the wheel 105 from the motor 91 and at the same time feed the said wheel 105 step by step toward the right-hand side of the machine. The various type-wheels 102 will thus be brought into position to print the number. During this part of the operation the idle wheels 114 are out of mesh with the adding-wheels 118, as shown in Fig. 16 and diagrammatically in Fig. 39. If now it is desired to remove the number from the machine, owing to its being an error, the intermediate wheels 114 are rotated by mechanism hereinafter to be described, as diagrammatically illustrated in Fig. 40, so as to return the intermediate wheels 95 and type-wheels 102 to their normal position, thus removing the number without in any way affecting the adding-wheels 118. If, however, the proper number is placed in the machine, the handle is operated so as to throw the adding-wheels 118 into engagement with the idle wheels 114, and the intermediate wheels 95 are returned to their normal position by the rotation of the shaft 109 and the consequent engagement of its comb 110 with the pins 111 on said wheels, so that the number is transferred from the type-wheels 102 to the adding-wheels 118, as diagrammatically illustrated in Fig. 41. In taking the sum the adding-wheels 118 are thrown into engagement with the idle wheels 114 and the shaft 119 rotated so as to bring the comb 121 into engagement with the lugs 120 on said adding-wheels, so that the sum is transferred from said adding-wheels to the type-wheels carried by the gears 101, as diagrammatically illustrated in Fig. 42. It will be evident that owing to this construction the type-wheels 102 are rotated in the same direction when taking the sum and when writing a number into the machine. At the same time that the sum is transferred from the adding-wheels 118 to the type-wheels 102 the tripping-pawls 100 of the order stop-pawls 96 are thrown into engagement with the gears 101 of the type-wheels 102, so as to properly position the carriage 74. When the type-wheels 102 are returned to zero, after taking the sum in the ordinary operation of the machine, the adding-wheels 118 are moved out of engagement with the idle wheels 114, as shown in Fig. 43, so that when the type-wheels are returned to zero the adding-wheels will also remain at zero. If, however, it is desired to take a subtotal—that is, to print the total in the machine and again return it to the adding mechanism, so as to have other numbers added thereto—the sub-total-key, hereinafter to be described, is operated so that the adding-wheels 118 will remain in engagement with the idle wheels 114 and the sum will be retransferred to the adding-wheels in the same manner that a number is transferred from the type-wheels to the adding-wheels in the ordinary operation of the machine.

The frame 130, Figs. 2 and 17 to 22, is held in its normal position, so as to hold the adding-wheels 118 out of mesh with the intermediate wheels 114 by means of a coiled spring 132, attached at one end to the said frame and at the other to the side frame 66. In order to force the frame down and bring the adding-wheels into engagement with the idle wheels 114, I provide on the inner face of the side frame 66 a cam 133. (See also Fig. 4.) The rock-shaft 129 is operated from the handle and carries an arm 135. The arm 135 has pivoted to it an arm 136, carrying a pin 137, which projects through the said arm at both sides, one end coöperating with the cam 133 and the other bearing upon the upper edge of the frame 130. In the ordinary operation of the machine when the handle is operated to rock the shaft 129 the pin 137 is moved to the front between the cam 133 and the frame 130, as shown in Fig. 19, thus forcing the frame down and bringing the adding-wheels into mesh with the idle wheels 114. Upon reaching the forward end of its stroke, however, the pin 137 passes below the guide 138, carried on a pivoted arm 139, and on its rearward movement is guided by the inclined surface of the guide 138, so as to pass above the cam 133. The adding-wheels are now free to move out of engagement with the idle wheels as far as the cam mechanism is concerned. In order to insure the proper operation of the parts, however, it is necessary to hold the said wheels in mesh during a portion of its back stroke. To accomplish this, I provide the frame 130 with a pin or projection 147 and the arm 135 with a similar pin or projection 143. The pin 148 passes over the pin 147, and this holds the frame 130 in its depressed position until the arm 135 has receded a sufficient distance to disengage the pins 147 and 148. In taking the total, however, it is necessary to keep the adding-wheels out of mesh with the idle wheels while the handle is being operated. This is accomplished by the mechanism shown in Fig. 9 and in detail in Fig. 23. The pin 137 rests upon a pin 134, which projects through an opening in the side frame 96. This pin 138 is carried by a lever 140, pivoted at 141. The lever is provided with two notches 142, which engage with a dog 143, which is adapted to hold the lever in either of two positions.

In the normal position of the lever, as shown in Fig. 8, the pin 137 is free to move below the cam 133, but when the lever is thrown into the position shown in Figs. 9 and 23 the pin will pass above the cam 133. The lever is thrown in its second position when the total-key is operated by a mechanism which will be hereinafter described. The lever is returned to its normal position either when the handle is pulled or when it is desired to take a subtotal.

In order to return the lever upon a pull of the handle, the shaft 129 is provided with an arm 144, adapted to strike a rear extension of the lever 140 and return to its normal position.

In order to return the lever to its normal position to take a subtotal, the case 61 is provided with a subtotal-key 146, Figs. 1 and 9, which is adapted to bear upon the forward end of the said lever 140.

In the ordinary operation of the machine when the shaft 129 is rocked by the pull of the main handle the pin 137 passes below the cam 133, so as to swing the frame 130 on its pivot 131, and thus move the adding-wheels into mesh with the idle wheels, so that the number may be transferred from the type-wheels to the adding-wheels. Upon the return movement, however, the pin 137 passes over the top of the cam 133, as illustrated in Fig. 22, so as to allow the adding-wheels to move out of engagement with the idle wheels. The pin 148 on the lever 135, however, remains in engagement with the pin 147 on the frame 130 a sufficient length of time to hold the idle wheels and adding-wheels together long enough to insure the proper carrying of the adding-wheels. When the total is taken, however, the lever 140 is operated by mechanism hereinafter to be described, so that it is moved into the position shown in Fig. 23, and immediately its pin 134 strikes against the pin 137 and raises it, so that upon the forward movement of the link 136 it passes above the cam 133, and consequently the adding-wheels remain out of mesh with the idle wheels, as has been hereinbefore described, and the adding-wheels remain at zero after the taking of the sum. When a subtotal is taken, however, the lever 140 is returned to its normal position, so that the adding-wheels are thrown into mesh with the idle wheels, and the sum is retransferred from the printing-wheels to the adding-wheels.

The mechanism operated by the error-key is best shown in Figs. 3, 4, 10, and 11. The error-key 150 is carried by a key-bar 151, pivoted to the frame 67 at 152. The key-bar 151 is provided intermediate of its length with a slot 153, which engages with a pin 154, carried on a segmental rack 155, loosely mounted on the end of the shaft 129. This rack 155 engages with a pinion 156, rigidly secured to the end of the idle-wheel shaft 115, so that when the error-key is depressed the wheels 95, 101, and 114 will be rotated in the direction diagrammatically illustrated in Fig. 40 to return the parts to their normal position. 157 is a segmental rack which is engaged by a pawl 158 on the error-key 151, so as to compel the complete operation of the key in either direction. Extending downwardly from the key-bar 151 is a link 159, attached to an arm 160. This arm 160 is rigidly secured to one end of a sleeve 161, (see also Fig. 5,) mounted upon a shaft 162. At the opposite end of the sleeve 161 is an arm 163, connected by a link 164 with an arm 165, loosely mounted on the handle-shaft 72. The arm 165 is provided with a pin 172, engaging a cam 173, also loosely mounted on the shaft 72. This cam 173 returns the carriage to its normal position. A pin-and-slot connection 174 connects the shaft 72 and the cam 173, so that the said cam can be moved independently by the error-key and the handle. The arm 163 is also provided with a projection 166, which is connected by a slotted link 167 with an arm 168, rigidly secured to one end of a rock-shaft 169. This rock-shaft 169 carries a blade 170, adapted to release the printing-slide 171, which will be hereinafter more fully described. The operation of the error-key thus returns the printing, intermediate, and idle wheels to their normal position and also returns the carriage and the printing-slide to their normal position. In operating the error-key it is also necessary to prevent the feeding of the paper. The mechanism by which this is accomplished is shown in detail in Figs. 25, 26, and 27. 175 is the paper-feed pawl, which engages with a ratchet-wheel 176 on the end of the paper-roller 177. The said pawl 176 is pivoted to a toothed segment 178, (see also Figs. 10 and 29,) carried by the side frame 67. This segment 178 meshes with a second segment 179, which is rigidly secured to the shaft 129 and is therefore operated each time the handle is pulled forward, thus accomplishing the feeding of the paper in the operation of the machine. In order to prevent the feeding of the paper when the error-key is operated, I pivot to the side frame 67 a lever 180, provided with a pin 181, projecting beneath the forward end of pawl 175. This lever 180 has a rearwardly-projecting tailpiece 182, which is arranged in the path of the pin 154, which is moved by the error-key. Thus when the error-key is operated the lever 180 is moved into the position shown in Fig. 26, raising the pawl 175 out of engagement with the ratchet-wheel 176. The lever 180 has pivoted to it an arm 185, which normally rests upon a tooth or projection 186, carried by the shaft 129, as shown in Fig. 25, so that the lever 180 can be moved into the position shown in Fig. 26, the said arm 185 sliding upon the top of the tooth or projection 186. When the handle is pulled after the operation of the error-key, the shaft 129 is rocked into the position shown in Fig. 27. Upon the return of the shaft to its normal position the tooth 186 engages with a shoulder on the arm 185 and throws the same to the rear, thus returning the lever 180 to its normal position. As the arm 185 nears the end of its movement a rounded shoulder 187 on the under edge of the same engages with the pin 189 and moves the said arm 185 slidingly upward, so as to bring it out of engagement with the tooth 186, so that it can again be thrown forward by the movement of the error-key. The movement of the paper-feed pawl 175 can be varied by an eccentric 190, carried by the segment 178 and held in position by a thumb-screw 191.

When a number is erroneously placed in the machine, the error-key 150 is depressed, thus swinging the error-key bar 151 on its pivot 152. The first movement of the error-key bar 151 is communicated, through the pin 154, working in the slot 153 in said bar, to the toothed sector 155, mounted on the shaft 129. This sector being in engagement with the wheel 156, secured to the end of the shaft 115, upon which are mounted the idle wheels 114, the said shaft is rotated, so as to bring its cam 116 into engagement with the pins 117 on said idle wheels, thus rotating the idle wheels and returning the intermediate wheels 95 and type-wheels 102 to zero. The movement of the key-bar 151 is also communicated, through the link 159, to the arm 160, (see Fig. 10,) which is secured to the sleeve 161 on the shaft 162. The movement of the sleeve 161 is communicated, through the arm 163 and link 164, to the cam 173, which returns the carriage 74 to its normal position. The movement is also communicated from the projection 166 on the arm 63 through the link 167 and arm 168 to the rock-shaft 169, carrying the plate 170, which releases the printing-slide 171 and allows the same to return to its normal position, so that when the handle is operated the printing mechanism will not be actuated. The movement of the key-bar 151, as hereinbefore stated, actuates the pin 154 on the sector 155, and consequently said pin comes in contact with the tailpiece 182 of the lever 180, and therefore the pin 181 of this lever raises the feed-pawl 175 out of engagement with the feed-wheel 176, as shown in Fig. 26 of the drawings, so that when the handle is operated the paper-feed mechanism will not be actuated. Upon the return of the handle, however, the tooth 186 on the shaft 129 engages with the shoulder on the link 187 and draws said link to the rear, so as to return the lever 180 to its normal position and allow the feed-pawl 175 to return into engagement with the feed-wheel 176.

In order to lock the order and numeral keys when the error-key is depressed, the rock-shaft 169, which is operated through the error-key, as hereinbefore described, is provided with a cam-plate 195, Figs. 5, 31, and 32, having a cam-surface 196, which bears upon a pin 197, carried on a rocking bar 198. (See also Fig. 24.) This bar 198 is pivoted to the side frame 68 by means of a pin 199, as shown in Fig. 24. The upper end of the rocking arm 198 is provided with an inclined portion 200, so as to be operated by the total-key, as will be hereinafter described. The lower end of said bar bears against an arm 201, which is adapted to move a comb 202, Figs. 1 and 2, and thus lock the order and numeral keys against depression after the error-key has been depressed. In order to release the keys upon the pull of the handle, the said cam-plate 195 is provided with a pin 203, which passes through a slot 204 in an arm 205. This arm 205 is pivoted to a projection 206, carried by a rock-shaft 207, which is operated upon the pull of the handle and upon which the printing-slide 171, hereinbefore referred to, slides. The printing-slide 171 is provided with a blade 208, Fig. 2, adapted to engage and operate the printing-hammers 209 when the shaft 207 is rocked.

When the shaft 169 is rotated by the movement of the error-key, as hereinbefore described, the cam 195, carried by said shaft, is operated so that its inclined face 196 comes in contact with the pin 197 on the lever 198, so that the said lever 198 moves the arm 201, and consequently operates the cam 202 to lock the order-keys 70 and numeral-keys 76 against movement. Upon the return movement of the error-key, however, the cam-block 195 is not returned to its normal position, owing to the slotted connection between the arm 168 and the link 167, as best shown in Fig. 10, and consequently the order and numeral keys remain locked until the operation of the handle. When the handle is operated, the shaft 207 is actuated, so that the link 205, carried by the pin 206 on said shaft, is moved until the end of its slot 204 comes in contact with the pin 203 on the cam 95, and thus returns the said cam to its normal position and releases the order and numeral keys.

210, Figs. 1, 4, and 8, is the total-key, carried on the total-key lever 211. This lever 211 is pivoted at 212 to the side frame 66. Formed in the lever 211 is an L-shaped slot 213, which engages with a pin 214 on a toothed sector 215, loosely mounted on the shaft 129. This sector 215 meshes with a gear-wheel 216, rigidly secured to the end of the shaft 119, upon which the adding-wheels are mounted. The movement of the total-key thus rotates the shaft 119 and the comb 121, Fig. 16, carried thereby, to transfer the sum accumulated in the adding-wheels to the printing-wheels. In order to bring the comb 121 into the path of the lugs 120 on the adding-wheels 118, a projection 217 is arranged on the total-key lever which engages with the end of the comb 121 and shifts it longitudinally, as in the Hopkins machine above referred to. In order to throw the adding-wheel into mesh with the idle wheel when the total-key is depressed, the total-key has pivoted to it a cam-plate 218. (Shown in detail in Fig. 28.) In the upper end of the cam-plate 218 is a cam-slot 219, having a lower rearwardly-inclined portion 220. This inclined portion 220 engages with a pin 221, which connects the arm 222 with a link 223. The arm 222 is loosely mounted upon the shaft 109, hereinbefore described. The upper end of the link 223 is provided with an elongated opening 224, which surrounds the projecting end of the shaft 119, and thus when the total-lever is depressed the action of the inclined portion 220 of the slot 219 upon the pin 221 throws the link 223 forwardly and downwardly and brings the adding-wheels into mesh with the idle wheels. The shape of the slot 219, hereinbefore described, allows this to take place before the sector 215 is moved to rotate the adding-wheels. The upper end of the slot 219 is adapted to come into contact with a pin 225 on an arm 226, loosely mounted on the end of the shaft 115. The opposite end of the arm 226 has pivoted to it a slotted link 227, the upper end of which is adapted to strike the lower forward end of the lever 140, hereinbefore described, so as to move this lever, and consequently the link 136, in the proper position when a sum is taken. The lever 226 is also provided with a link 228, which releases the carriage when the total-key is depressed. As the connections through which this link releases the carriage are not novel, it is not necessary to describe the same in particular. In order to compel the full movement of the total-key when the same is depressed, the shaft 109 has loosely mounted on it a ratchet-bar 229, Fig. 9, the teeth of which are adapted to engage with a pin 230, Fig. 8, on the inner side of the total-lever. The upper end of the ratchet-bar is adapted to be engaged by a hook 231, which holds the same out of engagement with the pin 230. Whenever the total-lever has reached the limit of its movement, the pin 230 will come in contact with a shoulder 232 and throw the ratchet-bar 229 back into position to be engaged by the hook 231, so that the lever can be returned to its normal position. Upon its return to the normal position it lifts the hook 231 out of engagement with the ratchet-bar, so that the same can move forward and be again in position to compel the complete operation of the total-lever. Below the slot 219 the plate 218 is provided with a second cam-slot 235. This cam-slot 235 engages with a pin 236 in an arm 237, which arm is pivoted to the side frame 64 at 238. The pivot-pin 238, connecting the arm 237 to the side frame, also serves as a guide running in the slot 235 to compel the proper movement of the plate 218. The pin 236 is connected, by means of a link 239, with a pivoted lever 240, (see also Fig. 1,) carrying a pin 241 at its rear end. This pin 241 works against the cam-face 242 on a lock-plate 243. This lock-plate 243 is adapted to take over a pin 244, carried by the swinging frame 84, hereinbefore described, and thus prevent the movement of the numeral-keys after the total-key has been depressed. The cam-plate 218 is also provided with a third cam-slot 245, which engages with a pin 246 in an arm 247. This arm 247 is rigidly secured to the end of the shaft 99, carrying the order stop-pawls, so that when the total-key is depressed the order stop-pawls are thrown into the path of the carriage 74. The shaft 99 has loosely mounted upon it, outside of the frame 64, a lock-plate 249. (See also Fig. 6.) This lock-plate 249 has an upward projection 250, adapted to be thrown into the path of the pin 236, thus preventing the downward movement of the total-key a second time without operating the handle. The plate 249 also has a rearward projection 251 resting on a pin 252 in a frame 253, operated by the order-keys, so that whenever an order-key is operated the plate 249 will be thrown into the path of the pin 236. The plate will remain in this position until the handle is operated.

When the handle is operated and the handle-shaft is rotated therefrom, the plate 149 is thrown into its normal position by the action of a link 254, pivoted to said plate and attached to one end of a spring 255, the opposite end of which is attached to a collar 256 on the handle-shaft 72.

In taking the total the total-key 210 is depressed, thus swinging the total-key bar 211 on its pivot 212. The first movement of the total-key bar moves the comb 121 longitudinally, so as to bring it into the path of the lugs 120 on the adding-wheels 118. At the same time the adding-wheel frame is drawn downward by the link 223, so as to bring the adding-wheels into engagement with the idle wheels. The further movement of the bar 211 is communicated, through the pin 214, to the toothed sector 215, which thus rotates the wheel 216 on the shaft 219, and thus causes the comb above referred to to come in contact with the lugs on the adding-wheels and return the adding-wheels to zero, thus transferring the sum from the adding-wheels to the printing-wheels. At the same time the movement of the key-bar 211 is communicated, through the plate 218, to the lever 226, to which is pivoted the link 227, which operates the lever 140, hereinbefore described, so as to prevent the adding-wheels from being thrown into engagement with the idle wheels upon the operation of the handle. The movement of the bar 211 is also communicated, through the plate 218, to the locking-plate 249, the upper end 250 of which is thus moved into the path of the pin 239, so that the total-key cannot be operated the second time before the handle is actuated.

In order to prevent the operation of the total-key when the handle is in its forward position, the rock-shaft 129, which is operated by the handle, has rigidly secured to its end an arm 260, Fig. 6. Pivoted to this arm 260 is a bar 261, the forward end of which is guided in a plate 262. This bar 261 has an inclined portion 263, as shown in Fig. 7. This inclined portion 263 is adapted to operate on a lock-plate 264, pivoted to the plate 262 at 265. This plate 264 has a locking projection 266, which is adapted to project below the total-key 211 when the arm 261 is moved forward. The plate 264 is held in its normal position by means of a coil-spring 267. The arm 260, which operates the shaft 129, has attached to it a link 270, the opposite end of which is attached to a short arm 271, Fig. 6, on the handle-shaft 72. This arm 271 has attached to it the locking device 201, hereinbefore described, and also has attached to it a link 272. The link 272 has in its upper end a pin 273, passing through a slot 274 in a plate 275. The object of the plate 275 is to operate the mechanism for returning the printing-wheels to zero upon the operation of the handle. The lower end of the plate 275 is bifurcated and straddles the handle-shaft 72. The upper end of the plate 275 is provided with two cam-slots 276 and 277. The slot 277 is L-shaped, as best shown in Fig. 6. Passing through the slot 277 is a stud 278, secured in the side frame 68. This stud 278 also serves as the pivot of a toothed sector 279. The toothed sector 279 engages with a spur-wheel 280, rigidly secured to the end of the shaft 109 of the intermediate gears. Upon the first movement of the handle the link 272 will be drawn downward, its pin 273 moving in the slot 274, so that no movement will be imparted to the plate 275 during the first part of the movement of the handle. This enables the printing and certain other operations to be performed before the shaft 109 is rotated to return the intermediate and type wheels to zero. As soon as the pin 273 has reached the lower end of the slot 274 the plate 275 will be drawn downward, this movement being allowed by the bifurcated end of said plate. The downward movement of the plate 275 will be communicated to the toothed sector 279 by means of a pin 281, carried by said sector and extending through the slot 276 in the plate 275, thus rotating the shaft 109. During the time that movement is imparted to the sector 279 the stud 278 will be in the vertical portion of the slot 277. As soon as the end of the vertical portion is reached the plate 275 will move forward instead of downward, and the sector 279 will remain stationary. During the downward movement of the plate 275 the transfer of the number from the printing-wheels to the adding-wheels is completed, so that the remainder of the handle-stroke consists of what I term "safety" and has no effect on the transfer of the number, but only insures the completion of the other movements of the machine, such as carrying. In addition to the arm 271 the handle-shaft 72 has secured outside of the side frame 68 an arm 283, to which is pivoted a link 284, attached to the piston-rod 285 of a dash-pot 286. The object of the dash-pot is to insure the even and steady return of the handle and parts operated thereby.

The shaft 109 has secured to it a projection or tooth 290, Figs. 6, 17, and 18, which is adapted to strike against the arm 291, and thus release a locking mechanism now to be described. Secured to the end of the idle-wheel shaft 115 immediately inside of the side frame 64 is a disk 292. (Shown in Figs. 6, 17, and 18.) This disk has a cut-away portion 293, adapted to receive a downward projection 294 upon the adding-wheel frame 130, so that when the disk is in its normal position, as shown in the figures referred to, the adding-wheel frame can be depressed. When, however, the shaft 115, and consequently the disk 292, is rotated, it will be impossible to depress the adding-wheel frame. This disk thus acts as a lock for the total-key during the time that the error-key is depressed, as the error-key causes the rotation of the shaft 115. In addition to the cut-away portion 293 the disk is also provided with a radial slot 295, and an arm 296 is connected to the arm 291, hereinbefore referred to, so that the two arms move in unison. This arm 296 has a turned-over end 297, adapted to enter the slot 295. The arm 291 is provided with a pin 298, which projects into the path of the lever 226, which strikes the pin 298 and throws the detent 297 into the slot 295, as shown in Fig. 18, thus locking the disk 292 against rotation. It is thus impossible to depress the error-key while the total-key is depressed, and after the return of the total-key to normal position the detent 297 will remain in the slot 295, and the error-key is still locked until the pull of the handle. Upon a pull of the handle the shaft 109 is rotated and the tooth 290 thus brought against the lower edge of the arm 291 to return the lock to its normal position, as shown in Fig. 17.

In Figs. 3, 37, and 38 the mechanism for preventing the movement of the handle is shown. Formed on the frame 69 is a curved track 300, and secured to the handle-shaft 72 is an arm 301, the end of which moves adjacent to the track 300. Carried by this arm 301 and situated between the arm and the track is a roller 302, the direction of which is adapted to be reversed by a hook 303. This hook is operated by the movement of the keys, so that the roller 302 cannot be reversed while any of the keys are in a depressed position. In order to provide additional means to prevent the movement of the handle while any of the keys are depressed, I provide the plate 304, carrying the roller 302, with a pin 305, and also provide an additional hook 306, adapted to engage said pin 305. In order to operate the hooks 303 and 306, I pivot to the frame 65 a bell-crank lever 307. One arm of said lever lies in the path of the arm 165, (see also Figs. 10 and 11,) which is operated by the error-key, and the other arm is provided with a pin 308. The pin 308 extends directly below the hooks 303 and 306, so as to operate the same when the error-key is depressed. As the mechanism for actuating the hooks 303 and 306 from the other keys of the machine is not novel, the same will not be described. This hook 306 is operated each time the hook 303 is moved out of the path of the plate 304, so that in case the handle should be pulled a sufficient distance to reverse the roller 302 before a key is depressed the depression would throw the hook 306 into the path of the pin 305, and thus again reverse the roller 302, so as to prevent the further movement of the handle. In order to prevent one numeral-key from being operated while the other is depressed, I place between each pair of numeral-key bars a locking-plate 310, loosely mounted on a rod 311, Fig. 2. The plates 310 are interlocked by means of half-pins 312. Each plate is provided with a front notch 313 and a rear notch 314. Each key-bar has projecting from its right side a pin 315, adapted to engage with the notch 313 of the locking-plate on the right side. Each key-bar also has projecting from its left side a pin 316, adapted to engage with the notch 314 on the locking-plate to the left. When one of the key-bars 77 is depressed, its pin 315 will move all the plates 310 at the right side toward the rear and its pin 316 will move all those at the left toward the front. Consequently the notch 314 of the plate to the right of the pin moved will engage the pin 316 of the numeral-key bar to the right, and the notch 313 of the plate to the left will engage the pin 315 of the key-bar to the left. All the key-bars 77, except the one operated, will be thus locked against movement until the first bar returns to normal position.

The complete operation of the machine is as follows: In writing a number into the machine one of the order-keys 70 is first depressed, bringing the carriage 74, Figs. 2 and 16, into the proper order. The numeral-keys 76 are now depressed to write the number into the machine. The operation of writing the number into the machine is substantially the same as that of the Hopkins patent above referred to. In my machine, however, the adding-wheels 118 are normally out of operative connection with the idle wheels 114, as diagrammatically illustrated in Fig. 40, and consequently the number is not put into the adding-wheels or accumulator upon the depression of the numeral-keys. As the work of driving the accumulating mechanism is thus taken off the motor-spring, said spring can be made light, and consequently the touch of the numeral-keys can be lightened. This construction also obviates the use of two sets of type on the type-wheels and enables me to remove the number from the machine without in any way disturbing the adding-wheels. In order to remove a number from the machine, the error-key 150 is depressed. The depression of the error-key 150 operates the toothed sector 155, Figs. 3, 4, and 10, thus rotating the wheel 156, and consequently the shaft 115, upon which the same is mounted. When the shaft 115 is rotated, the comb 116, Fig. 16, comes in contact with the pins 117 of the idle wheels 114 in each order in which a number has been written into the machine, and these wheels are thus returned to their normal position, thus taking the number out of the printing-wheels, as diagrammatically illustrated in Fig. 40. The movement of the error-key is also transmitted through the link 159 to the arm 160, Fig. 10, thus rotating the sleeve 161, on which said arm is carried. The rotation of this sleeve 161 is communicated, through the arms 163 and 165 and link 164, to the cam 173, which returns the carriage to its normal position. The movement of the sleeve is also communicated, through the link 167 and arm 168, to the rock-shaft 169, carrying the plate 170, which releases the printing-slide 171, thus returning the printing-slide to its normal position. In addition to these operations it is desirable to prevent the paper from being fed when the error-key is depressed. This is accomplished by the action of the pin 154, Figs. 10 and 25 to 27, on the tailpiece 182 of the lever 180. The contact of the pin 154 with the tailpiece of said lever swings the lever on its pivot and brings the pin 181 in contact with the lower edge of the paper-feed pawl 175, thus lifting the pawl out of engagement with the ratchet-wheel 176. After the error-key has been depressed it is necessary to operate the handle before another number is written into the machine, so that the motor may be rewound. In order to compel this operation of the handle, the comb 202, Figs. 1 and 2, is operated through the lock-bar 201. This lock-bar 201 is moved by means of the lever 198, Fig. 24, which is operated by the rock-shaft 169. The movement of the rock-shaft 169, as has hereinbefore been described, moves the cam-plate 195, Figs. 31 and 32, bringing the cam-surface 196 of the plate against the pin 197 on the lever 198. When the handle is pulled after the depression of the error-key, this locking device is released by means of the link 205, operated by the shaft 207, said link moving the cam-plate 195 to its normal position. The movement of the handle also rocks the shaft 129, Figs. 25 to 27, thus bringing the tooth 186 against the shoulder of the link 185, thus moving the plate 180 to its normal position and allowing the paper-feed pawl 175 to come into engagement with the ratchet-wheel 176.

After the number has been written into the machine, as above described, if the number is found to be correct, in place of depressing the error-key the handle is drawn forward. The first movement of the handle is imparted through the link 317, Fig. 3, and arm 318 to the shaft 207, Figs. 2, 10, and 11. This operates the printing-slide 171, and thus the hammers 209. After the shaft 207 has been rotated sufficiently to cause the slide to operate the hammers the said slide is released by the pressure of its pawl against the shaft 169. The movement of the handle also operates the cam 173, thus returning the carriage to its normal position. The movement of the handle is also communicated, through the arm 271 and link 270, Fig. 6, to the arm 260, rigidly mounted on the shaft 129, thus rocking said shaft. The movement of the shaft 129 throws the arm 135 forward, as shown in Fig. 20. The arm 135 carries link 136, on which is the double pin 137, one end of which passes below the cam and the other of which bears upon the upper edge of the adding-wheel frame 130, thus forcing the frame downward and bringing the adding-wheels 118, Fig. 16, into engagement with the idle wheels 114, as shown diagrammatically in Fig. 42. During this part of the movement of the handle the pin 273 in the link 272 has moved in the slot 274, Fig. 6, until it comes to the lower end of said slot, after which the plate 275 is moved downward, thus swinging the toothed sector 279 on its pivot to actuate the spur-wheel 280. The actuation of the spur-wheel 280 rotates the shaft 109, upon which it is rigidly mounted, thus bringing the comb 110 of said shaft into engagement with the pins 111, returning the intermediate gears 95, which have been rotated in printing the number into the machine. This rotation of the intermediate gears 95 will return the type-wheel gears 101 to their normal position and transfer the number into the adding-wheels 118, as shown diagrammatically in Fig. 41.

When it is desired to take the sum of the numbers which have been added into the wheels 118, the total-key 210, Figs. 1, 4, and 8, is depressed, thus swinging the total-key bar 211 on its pivot. During the first part of the movement of the total-key bar 211 the downward projection 217 on said bar moves the comb 121 in the adding-wheel shaft 119, so as to bring the comb into the path of the lugs or auxiliary teeth 120 on the adding-wheels. The further movement of the total-key bar brings the upper edge of the slot 213 into engagement with the pin 214 on the sector 215, thus swinging the said sector 215 on the shaft 129 and rotating the gear-wheel 216 on the adding-wheel shaft 119. This causes the comb 121, Fig. 16, to come into contact with the lugs 120 of all the adding-wheels which are out of normal position, so that the adding-wheels are brought to zero, thus transferring the sum, through the idle wheels 114 and intermediate wheels 95, to the type-wheels 101, as shown diagrammatically in Fig. 42. This movement of the total-key bar, through the plate 218 and arm 247, rocks the shaft 199, which carries the order stop-pawls 96, thus throwing the said pawls into the path of the carriage 74, the upper end of the dogs 100 being brought into engagement with the teeth of the type-wheel gears 101, so that the said order stop-pawls are tripped to stop the carriage in the proper order to print the sum.

In case it is desired to bring the machine to zero after the sum is taken the handle is now drawn forward, the parts being returned to normal position in the same manner as when printing the number into the machine. If, however, in place of bringing the machine to zero it is desired to retransfer the total into the adding-wheels, the subtotal-key 146 is depressed. The depression of this key 146 depresses the lever 140, so that the link 136 is allowed to drop back into its normal position, and thus cause the pin 137 to come between the cam 133 and the top of the adding-wheel frame 130, so that the frame will be depressed in the same manner as when the number is written into the machine, and consequently the adding-wheels will remain in engagement with the idle wheels and when the printing-wheels are returned to zero the sum will be retransferred into the adding-wheels.

Having fully described my invention, what I claim as new, and desire to secure by Letters Patent of the United States, is—

1. In an adding-machine, the combination with adding mechanism, of item-recording mechanism, numeral-keys for controlling said item-recording mechanism, a translating device movable relatively to said recording mechanism and successively connecting said numeral-keys with the different orders thereof, and means for actuating said recording mechanism while out of operative connection with said adding mechanism.

2. In an adding-machine, the combination with adding mechanism, of item-recording mechanism, numeral-keys for controlling said recording mechanism, a translating device movable relatively to said recording mechanism and successively connecting said numeral-keys with the different orders thereof, means for actuating said recording mechanism while out of operative connection with said adding mechanism, and means for returning said recording mechanism to zero while out of operative connection with said adding mechanism.

3. In an adding-machine, the combination with adding mechanism, of item-recording mechanism, numeral-keys for controlling said recording mechanism, a translating device movable relatively to said item-recording mechanism and successively connecting said numeral-keys to the different orders thereof, means for actuating said recording mechanism while out of operative connection with said adding mechanism, means for returning said recording mechanism to zero while out of operative connection with said adding mechanism, and independent means for returning said recording mechanism to zero while in operative connection with said adding mechanism.

4. In an adding-machine, the combination with adding-wheels, of item-wheels, numeral-keys, a translating device movable relatively to said item-wheels for successively connecting said numeral-keys with the item-wheels of the different orders, and means for actuating said item-wheels while out of operative connection with said adding-wheels.

5. In an adding-machine, the combination with adding-wheels, of item-wheels, numeral-keys, a translating device movable relatively to said item-wheels for successively connecting said numeral-keys with the item-wheels of the different orders, means for actuating said item-wheels while out of operative connection with said adding-wheels, and means for returning said item-wheels to zero while out of operative connection with said adding-wheels.

6. In an adding-machine, the combination with adding mechanism, of numeral-keys, item-indicating devices adapted to be brought successively into operative connection with said numeral-keys, means for actuating said item-indicating devices while out of operative connection with said adding mechanism, and means for transferring the sum from said adding mechanism to said item-indicating devices.

7. In an adding-machine, the combination with adding mechanism, of numeral-keys, item-indicating devices adapted to be brought successively into operative connection with said numeral-keys, means for actuating said item-indicating devices while out of operative connection with said adding mechanism, means for returning said item-indicating mechanism to zero while out of operative connection with said adding mechanism, and means for transferring the sum from said adding mechanism to said item-indicating devices.

8. In an adding-machine, the combination with adding mechanism, of numeral-keys, item-indicating devices adapted to be brought successively into operative connection with said numeral-keys, means for actuating said item-indicating devices while out of operative connection with said adding mechanism, means for returning said item-indicating devices to zero while out of operative connection with said adding mechanism, independent means for returning said item-indicating devices to zero while in operative connection with said adding mechanism, and means for transferring the sum from said adding mechanism to said item-indicating devices.

9. In an adding-machine, the combination with adding-wheels, of numeral-keys, item-wheels adapted to be brought successively into operative connection with said numeral-keys, means for actuating said item-wheels while out of operative connection with said adding-wheels, and means for transferring the sum from said adding-wheels to said item-wheels.

10. In an adding-machine, the combination with adding-wheels, of numeral-keys, item-wheels adapted to be brought successively into operative connection with said numeral-keys, means for actuating said item-wheels while out of operative connection with said adding-wheels, means for returning said item-wheels to zero while out of operative connection with said adding-wheels, and means for transferring the sum from said adding-wheels to said item-wheels.

11. In an adding-machine, the combination with adding-wheels, of item-wheels, numeral-keys, a translating device for successively connecting said numeral-keys with the item-wheels of the different orders, means for actuating said item-wheels while out of operative connection with said adding-wheels, means for returning said item-wheels to zero while out of operative connection with said adding-wheels, and independent means for returning said item-wheels to zero while in operative connection with said adding-wheels.

12. In an adding-machine, the combination with item-wheels, of adding-wheels, numeral-keys, an axially-movable wheel for successively connecting said numeral-keys with said item-wheels, and means for actuating said item-wheels while out of operative connection with said adding-wheels.

13. In an adding-machine, the combination with item-wheels, of adding-wheels, numeral-keys, an axially-movable wheel for successively connecting said numeral-keys with said item-wheels, means for actuating said item-wheels while out of operative connection with said adding-wheels, and means for returning said item-wheels to zero while out of operative connection with said adding-wheels.

14. In an adding-machine, the combination with item-wheels, of adding-wheels, numeral-keys, an axially-movable gear for successively connecting said numeral-keys with said item-wheels, means for actuating said item-wheels while out of operative connection with said adding-wheels, means for returning said item-wheels to zero while out of operative connection with said adding-wheels, and independent means for returning said item-wheels to zero while in operative connection with said adding-wheels.

15. In an adding-machine, the combination with item-recording devices, of adding devices, numeral-keys, a translating device for successively connecting said order-keys with the recording devices of the different orders, means for actuating said recording devices while out of operative connection with said adding devices, an error-key for returning said recording devices to zero while out of operative connection with said adding devices, and a handle for returning said recording devices to zero while in operative connection with said adding devices.

16. In an adding-machine, the combination with adding-wheels, of item-wheels, numeral-keys, a translating device for successively connecting said order-keys with said item-wheels, means for actuating said item-wheels while out of operative connection with said adding-wheels, an error-key for returning said item-wheels to zero while out of operative connection with said adding-wheels, and a handle for returning said item-wheels to zero while in operative connection with said adding-wheels.

17. In an adding-machine, the combination with item-wheels, of adding-wheels, numeral-keys, an axially-moving wheel for successively connecting said numeral-keys with said item-wheels, means for actuating said item-wheels while out of operative connection with said adding-wheels, an error-key for returning said item-wheels to zero while out of operative connection with said adding-wheels, and a handle for returning said item-wheels to zero while in operative connection with said adding-wheels.

18. In an adding-machine, the combination with item-wheels, of intermediate gears meshing with said item-wheels, adding-wheels adapted to be thrown into and out of operative connection with said intermediate gears, numeral-keys, an axially-movable wheel adapted to mesh with said intermediate wheels and controlled by said numeral-keys, adding-wheels, and an error-key for returning said item and intermediate wheels to zero while out of operative connection with said adding-wheels.

19. In an adding-machine, the combination with item-wheels, of intermediate gears meshing with said item-wheels, adding-wheels adapted to be thrown into and out of operative connection with said intermediate gears, numeral-keys, an axially-moving wheel adapted to mesh with said intermediate wheels and controlled by said numeral-keys, adding-wheels, an error-key for returning said item and intermediate wheels to zero while out of operative connection with said adding-wheels, and a handle for returning said item and intermediate gears to zero while in operative connection with said adding-wheels.

20. In an adding-machine, the combination with adding mechanism, of item-recording mechanism, numeral-keys, translating devices for connecting said numeral-keys successively with said recording mechanism of the different orders, and an error-key for returning said recording mechanism to zero.

21. In an adding-machine, the combination with adding mechanism, of item-recording mechanism, numeral-keys, translating devices for connecting said numeral-keys successively with the recording mechanism of the different orders, and an error-key for returning said recording mechanism to zero while out of operative connection with said adding mechanism.

22. In an adding-machine, the combination with adding mechanism, of item-recording mechanism, numeral-keys, translating devices for connecting said numeral-keys successively with the recording mechanism of the different orders, a main shaft for returning said recording mechanism to zero, and an error-key for returning said recording mechanism to zero independently of said main shaft.

23. In an adding-machine, the combination with item-wheels, of intermediate wheels meshing with said item-wheels, a translating device determining the item-wheel to be actuated, idle wheels meshing with said intermediate wheels, and adding-wheels adapted to be thrown into and out of engagement with said idle wheels.

24. In an adding-machine, the combination with item-wheels, of intermediate wheels meshing with said item-wheels, a translating device determining the item-wheel to be actuated, idle wheels meshing with said intermediate wheels, adding-wheels adapted to be thrown into and out of engagement with said idle wheels, and an error-key for operating said idle wheels.

25. In an adding-machine, the combination with item-wheels, of intermediate wheels meshing with said item-wheels, a translating device determining the item-wheel to be actuated, idle wheels meshing with said intermediate wheels, adding-wheels adapted to be thrown into and out of engagement with said idle wheels, an error-key for operating said idle wheels, and a handle for operating said intermediate wheels.

26. In an adding-machine, the combination with item-wheels, of intermediate wheels meshing with said item-wheels, idle wheels meshing with said intermediate wheels, adding-wheels adapted to be thrown into and out of engagement with said idle wheels, means for actuating said item-wheels while said idle wheels are out of engagement with said adding-wheels, means for actuating said idle wheels while out of engagement with said adding-wheels, and means for actuating said intermediate wheels while said adding-wheels are in engagement with said idle wheels.

27. In an adding-machine, the combination with item-wheels, of a translating device determining the item-wheel to be actuated, intermediate wheels meshing with said item-wheels, idle wheels meshing with said intermediate wheels, adding-wheels adapted to be thrown into and out of engagement with said idle wheels, an error-key for rotating said idle wheels while out of engagement with said adding-wheels, and a handle for rotating said intermediate wheels while said adding-wheels are in engagement with said idle wheels.

28. In an adding-machine, the combination with item-recording mechanism, of adding mechanism, numeral-keys, a translating device interposed between said numeral-keys and recording mechanism and controlling the movement of the latter in one direction, means for actuating said recording mechanism in the opposite direction, and means for actuating said adding devices to move said recording devices in the first-named direction.

29. In an adding-machine, the combination with item-wheels, of adding-wheels, numeral-keys, a translating device interposed between said numeral-keys and item-wheels and controlling the movement of the latter in one direction, means for actuating said item-wheels in the opposite direction, and means for actuating said adding-wheels to move said item-wheels in the first-named direction.

30. In an adding-machine, the combination with item-wheels, of adding-wheels, numeral-keys, a laterally-movable carriage interposed between said numeral-keys and item-wheels and controlling the movement of the latter in one direction, means for actuating said item-wheels in the opposite direction, and means for actuating said adding-wheels to move said item-wheels in the first-named direction.

31. In an adding-machine, the combination with item-wheels, of adding-wheels, numeral-keys, a carriage including an axially-movable wheel interposed between said numeral-keys and said item-wheels and actuating the latter in one direction, means for moving said item-wheels in the opposite direction, and means for actuating said adding-wheels to move the said item-wheels in the first-named direction.

32. In an adding-machine, the combination with item-recording devices, of a translating device determining the item-recording device to be actuated, adding devices, a total-key for transferring the sum from said adding devices to said recording devices, and a subtotal device for transferring the sum from said recording devices to said adding devices.

33. In an adding-machine, the combination with item-wheels, of a translating device determining the item-wheel to be actuated, adding-wheels, means for transferring the sum from said adding-wheels to said item-wheels, an error-key, and a subtotal device independent of said error-key for transferring the sum from said item-wheels to said adding-wheels.

34. In an adding-machine, the combination with adding devices, of item-recording devices, numeral-keys, a translating device interposed between said numeral-keys and recording devices, a total mechanism for transferring the sum from said adding devices to said recording devices, an error-key, and a subtotal device independent of said error-key for transferring the sum from the recording devices to said adding devices.

35. In an adding-machine, the combination with adding-wheels, of item-wheels, intermediate gears in mesh with said item-wheels, an operating-handle, operating means actuated by said handle for throwing said adding-wheels into operative connection with aid intermediate wheels, a total-key for transferring the sum from said adding-wheels to said item-wheels, said total-key rendering said operating means inoperative, and a subtotal mechanism rendering said operating means operative.

36. In an adding-machine, the combination with item-wheels, of adding-wheels, intermediate wheels in mesh with said item-wheels, idle wheels in mesh with said intermediate wheels, an operating-handle adapted to move said adding-wheels into mesh with said intermediate wheels, a total-key for moving said adding-wheels into mesh with said intermediate wheels and rendering said handle inoperative, and a subtotal mechanism for rendering said handle operative.

37. In an adding-machine, the combination with item-wheels, of adding-wheels, a pivoted frame carrying said adding-wheels, a cam device for moving said frame to bring said adding-wheels into operative connection with said item-wheels, a total-key adapted to move said frame and to render said cam means inoperative, and a subtotal device for rendering said cam means operative.

38. In an adding-machine, the combination with item-wheels, of adding-wheels, a pivoted frame carrying said adding-wheels, an operating-handle, a cam mechanism operated by said handle to move said frame to bring said adding-wheels into operative connection with said item-wheels, and a locking device operated by said cam mechanism for retaining said frame in position.

39. In an adding-machine, the combination with item-wheels, of adding-wheels, a pivotally-mounted frame carrying said adding-wheels, a stationary frame carrying said pivotally-mounted frame, an operating-handle, a cam mechanism operated by said handle to move said frame to bring said adding-wheels into operative connection with said item-wheels, a projection carried by said pivotally-mounted frame, and a locking device carried by said stationary frame and engaging said projection to hold said adding-wheels in operative connection with said item-wheels after said cam mechanism is out of operation.

40. In an adding-machine, the combination with item-wheels, of adding-wheels, a pivoted frame carrying said adding-wheels, an operating-handle, a cam mechanism operated by said handle to move said frame to bring said adding-wheels into operative connection with said item-wheels, a projection on said pivotally-mounted frame, a movable arm, and a second projection carried by said arm and engaging with said first-named projection to hold said adding-wheels into operative connection with said item-wheels after said cam mechanism is out of operation.

41. In an adding-machine, the combination with adding devices, of a handle therefor, carrying mechanism for said adding devices, devices normally locking said carrying mechanism, and means for releasing said locking devices, said latter-named means being operated by the handle.

42. In an adding-machine, the combination with adding devices, of a handle therefor, carrying mechanism for said adding devices, means normally locking said carrying mechanism against movement, means for releasing said locking device by the operation of the handle, said locking device also operating to return said carrying mechanism to normal position.

43. In an adding-machine, the combination with adding-wheels, of carrying-bars for said adding-wheels, means normally locking said carrying-bars against movement, a handle for releasing said locking means, said locking means also returning said carrying-bars to normal position.

44. In an adding-machine, the combination with adding-wheels, of a handle therefor, carrying-bars for said adding-wheels, projections carried by said carrying-bars, a locking-comb normally bearing against said projections and locking said bars against movement, and means operated by the handle for moving said comb out of the path of said projections, said comb being returned by the handle to actuate said carrying-bars.

45. In an adding-machine, the combination with adding mechanism, of item-recording mechanism, a total-key for transferring the total from said adding to said recording mechanism, a carriage, order stop-pawls for said carriage, and connections operated by said total-key for throwing said order stop-pawls into engagement with a movable part of said recording mechanism in the same direction in which said part is moved to transfer the total.

46. In an adding-machine, the combination with item and adding wheels, of a carriage controlling the movement of said wheels, order stop-pawls, a total-key for transferring the total from said adding to said item wheels, and connections operated by said total-key for throwing said order stop-pawls into engagement with said item-wheels in the same direction in which said wheels are moved in transferring the total.

47. In an adding-machine, the combination with item and adding wheels, of a carriage controlling the movement of said wheels, a total-key for transferring the sum from said adding-wheels to said item-wheels, order stop-pawls moved by said total-key into the path of the carriage, a dog carried by each of said pawls and locking the same, and a second dog operating said first-named dog and adapted to be thrown into the path of said item-wheels.

48. In an adding-machine, the combination with adding devices, of numeral-keys for said adding devices, a lock for said numeral-keys, a handle adapted to operate said lock, an error-key, a cam-plate actuated by said error-key for operating said lock, and means operated by said handle for releasing said lock.

49. In an adding-machine, the combination with adding devices, of numeral-keys for said adding devices, a lock for said numeral-keys, a handle adapted to actuate said lock, a pivoted lever also adapted to actuate said lock, a cam-plate for actuating said pivoted lever, a total-key for actuating said cam-plate, and connections operated by the handle for returning said cam-plate to normal position.

50. In an adding-machine, the combination with adding devices, of numeral-keys for said adding devices, a pivotally-mounted frame carrying said adding devices, item-recording devices including a set of rotating gears, an error-key for rotating said gears, and a lock operated by said error-key for preventing the movement of the pivotally-mounted frame.

51. In an adding-machine, the combination with adding devices, of numeral-keys for said adding devices, a pivotally-mounted frame carrying said adding devices, a total-key for transferring the total from said adding devices, item-recording devices including a set of rotating gears, an error-key for rotating said gears, and means operated by the movement of said total-key for preventing the rotation of said gears.

52. In an adding-machine, the combination with adding devices, of numeral-keys for said adding devices, a pivotally-mounted frame carrying said adding devices, a total-key for transferring the sum from said adding devices, item-recording devices including a set of rotary gears, a shaft on which said gears are mounted, an error-key for rotating said shaft, and a locking device mounted on said shaft for preventing movement of said pivoted frame.

53. In an adding-machine, the combination with adding devices, of numeral-keys for said adding devices, a pivotally-mounted frame carrying said adding devices, a total-key for transferring the sum from said adding devices, item-recording devices including a set of rotary gears, a shaft on which said gears are mounted, an error-key for rotating said shaft, and devices operated by the total-key for locking said shaft.

54. In an adding-machine, the combination with adding devices, of item-recording devices, an error-key for removing a number from said recording devices, a total-key for transferring the sum from said adding devices to said recording devices, and a lock operated by said error-key for preventing the movement of the total-key.

55. In an adding-machine, the combination with adding devices, of item-recording devices, an error-key for removing a number from said recording devices, a total-key for transferring the sum from said adding devices to said recording devices, and a lock operated by said total-key for preventing the movement of said error-key.

56. In an adding-machine, the combination with adding devices, of item-recording devices, an error-key to remove a number from said recording devices, a total-key for transferring the sum from said adding to said recording devices, a lock operated by the movement of said total-key for preventing the movement of the error-key, a handle, and connections operated by said handle for releasing said lock.

57. In an adding-machine, the combination with item-recording devices, of movably-mounted adding devices, an error-key for removing a number from said recording devices, a total-key for transferring the sum from said adding to said recording devices, and a lock operated by said error-key for preventing the movement of the total-key, said lock also preventing the movement of said adding devices.

58. In an adding-machine, the combination with numeral-keys, of key-bars actuated thereby, a pivoted plate between each pair of key-bars, a half-pin projecting from each side of the pivoted plates and interlocking with pins on adjacent plates, and a pin projecting from each side of each key-bar and adapted to move the plate in one side thereof in one direction and that in the other side thereof in the opposite direction.

In testimony whereof I have hereunto set my hand and affixed my seal in the presence of the two subscribing witnesses.

GEORGE N. HINCHMAN. [L. S.]

Witnesses:
W. A. ALEXANDER,
BENNETTE PIKE.